United States Patent [19]
Sato et al.

[11] Patent Number: 5,491,330
[45] Date of Patent: Feb. 13, 1996

[54] AMBIENT LIGHT DETECTOR, LASER LIGHTING CONTROL DEVICE USING THE SAME SUITABLE FOR BAR CODE READER, AND BAR CODE READER

[75] Inventors: Shinichi Sato; Toshimitsu Kumagai; Isao Iwaguchi; Ichiro Shinoda, all of Kawasaki, Japan

[73] Assignee: Fujitsu Limited, Kawasaki, Japan

[21] Appl. No.: 234,966

[22] Filed: Apr. 28, 1994

[30] Foreign Application Priority Data

Aug. 10, 1993 [JP] Japan .................... 5-198675

[51] Int. Cl.⁶ .................................. H01J 40/14
[52] U.S. Cl. .................. 250/214 AL; 235/470
[58] Field of Search ............ 250/214 AL, 214 P, 250/214.1, 214 RC, 214 LS, 235, 226, 556; 235/470, 462, 472, 473, 454, 467

[56] References Cited

U.S. PATENT DOCUMENTS 5,023,818  6/1991  Wittensoldner et al. ............ 235/470
5,059,777 10/1991  Wittensoldner et al. ............ 235/470
5,180,904  1/1993  Shepard et al. ..................... 235/470

FOREIGN PATENT DOCUMENTS 2064238A   6/1981  United Kingdom.
2142177A   1/1985  United Kingdom.
2204946A  11/1988  United Kingdom.

Primary Examiner—Edward P. Westin
Assistant Examiner—Que T. Le
Attorney, Agent, or Firm—Armsrong, Westerman, Hattori, McLeland & Naughton

[57] ABSTRACT

The present invention relates to an ambient light detector, a laser lighting control device using the same suitable for a bar code reader, and a bar code reader. The object is to require no explanation on a special operation and to realize an easy device design and a low manufacturing cost. Each device includes an ambient light detector to detect light around a peripheral device, and judging device to provide a signal indicating that an ambient light detected by the ambient light detector has exceeded a predetermined value over a predetermined time.

45 Claims, 17 Drawing Sheets

43,35
33 — LASER EMITTING UNIT
34 — SCANNING MECHANISM
30

PHOTO DIODE 43
PHOTOELECTRIC CONVERSION UNIT 35

DIRECTIVITY ADDING MEANS
10
PHOTO DIODE
PHOTOELECTRIC CONVERTING UNIT
35
43

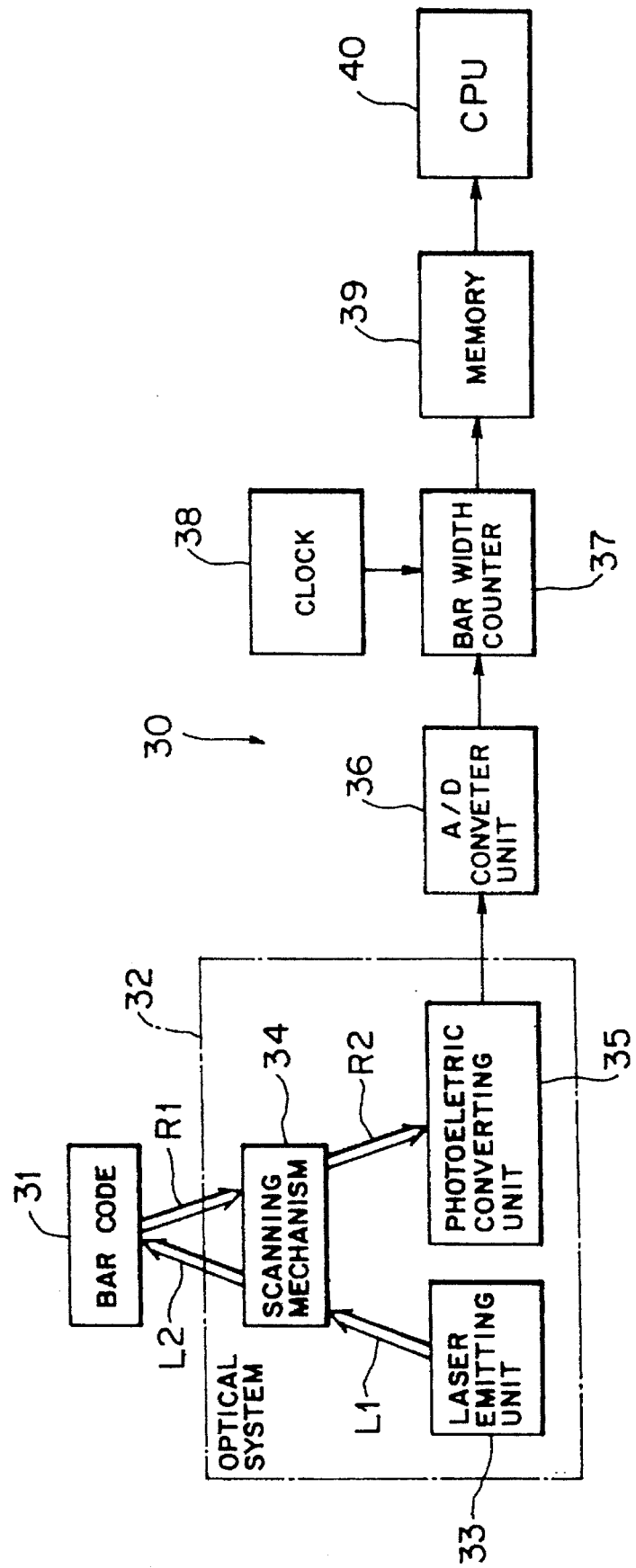

AMBIENT LIGHT DETECTOR, LASER LIGHTING CONTROL DEVICE USING THE SAME SUITABLE FOR BAR CODE READER, AND BAR CODE READER

BACKGROUND OF THE INVENTION

1) Field of the Invention

The present invention relates to an ambient light detector, a laser lighting control device using the same suitable for use in a bar code reader, and a bar code reader.

2) Description of the Related Art

FIG. 20 is a block diagram showing the configuration of a bar code reading device (bar code reader). Referring now to FIG. 20, numeral 31 represents a bar code printed on a surface of an article, the bar code being formed of plural black bars and white bars arranged alternately. A predetermined datum is represented based on the width of each black bar and the width of each white bar.

An optical system (laser scanner device) 32 irradiates a laser beam L2 to the bar code 31 and receives a reflected light R1 of the laser beam L2 reflected by the bar code 31. The optical system 32 also is constituted of a laser emitting unit 33, a scanning mechanism 34 and an optical converting unit 35. The laser emitting unit 33 includes a semiconductor laser for emitting a laser beam L1.

The scanning mechanism 34 is constituted of a polygon mirror that is rotatably driven with, for example, a motor. The scanning mechanism 34 also irradiates the laser beam L1 to the plural black bars and white bars forming the bar code 31, the beam L2 formed by reflecting the laser beam L1 from the laser emitting unit 33, while it moves and scans the laser beam at a fixed rate in the direction perpendicular to the black and white bars of the bar code 31.

The scanning mechanism 34 irradiates the reflected beam R1 as the reflected beam R2 to the photoelectric converting unit 35, the reflected beam R1 being the laser beam L2 reflected by the bar code 31 and traveled with the laser beam L2 scanned.

The photoelectric converting unit 35 is formed of a photoelectric converting element, for example, a photo diode. The photoelectric converting unit 35 also receives the reflected light R2 (light input signal) via the scanning mechanism 34 to convert it to an electric signal (analog value) corresponding to the light amount thereof.

Numeral 36 represents an A/D converter unit which digitize an electrical signal from the photoelectric converting unit 35. The A/D converter unit 36 digitizes the electric signal from the photoelectric converting unit 35 to convert it to a binary signal including a black level signal corresponding to each black bar portion and a white level signal corresponding to each white bar portion in the bar code 31. The white level signal represents a high level signal and the black level signal represents a low level signal because the light amount of the light R2 reflected by each white bar portion is larger than that of the light R2 reflected by each black bar portion in the binary signal.

Numeral 37 represents a bar width counter which counts clock signals from the clock generator 38. The bar width counter 37 also outputs as clock signal count value the time widths of the black level signal portion and the white level signal portion of a binary signal from the A/D converter unit 36, or each black bar width and each white bar width of an actual bar code 31.

Furthermore, the memory 39 stores the bar width count value from the bar width counter 37. The CPU 40 extracts and demodulates predetermined data having the bar code 31 based on the bar width count value (a value corresponding to each black bar width or each white bar width) stored in the memory 39.

In the above structure, the scanning mechanism 34 irradiates the laser beam L1 as the laser beam L2 emitted from the laser emitting unit 33 to the black bar and the white bar of the bar code 31 while it moves and scans the laser beam at a constant rate and in the direction perpendicular to the black bar and white bar of the bar code 31.

The laser beam L2 emitted from the scanning mechanism 34 is scatteringly reflected on a portion of the bar code 31 and is re-irradiated as the reflected light R1 to the scanning mechanism 34. The reflected light R1 varies its reflection angle as the laser beam L2 scans and moves. However the polygon mirror constituting the scanning mechanism 34 reflects the reflected light R1 to input it as the reflected light R2 to the photoelectric conversion element in the photoelectric converting unit 35 arranged at a predetermined place.

The photoelectric converting unit 35 converts the reflected light R2 to an electric signal corresponding to the light amount thereof. The A/D converter unit 36 digitalizes the electric signal into a binary signal including a black level signal corresponding to each black level portion and a white level signal corresponding to each white level portion of the bar code 31.

Then, the bar width counter 37 counts the clock signals from the clock generator 38 to measure as a clock signal count value the time width (values corresponding to the widths of each black level signal portion and each white level signal portion in an actual bar code 31) of the black level signal portion and the white level signal portion of a binary signal from the A/D converter unit 36. The memory 39 stores temporarily the count value. The CPU 40 subjects the bar width count value stored in the memory 39 to a predetermined demodulation process to extract and demodulate the determined data of the bar code 31.

In the binary device used for the bar code reader, noises with higher frequency components are attenuated through an integration operation to improve the bar width detection accuracy.

In comparison with the He-Ne gas laser, the semiconductor laser in the laser emitting unit 33 is smaller and operates at a lower power consumption. However there is a problem that its operational life is short.

To cope with the above problem, various proposals have been made to prolong the serviceable life of the semiconductor laser used for the laser bar code reader.

For example, according to a proposal, a laser is turned off when a reading operation is not performed for a fixed period of time and then it is re-activated by a means at a re-reading operation time. As the means, a method has been considered, for controlling an activation/suspension by an operator's button switching operation, or for controlling an activation/suspension by detecting bar code information from an operator based on a presence or absence of the reflected light of an LED emitting light.

However, as described above, there is a problem in providing an improved operability and automated system because the push button switching system, for example, requires an explanation on how the bar code operates and how to control the bar code reader to an operator.

Moreover in the reflection-type sensor system using a reflected LED light, there is a disadvantage in that the position to mount the LED is limited and taking the operational life of the LED in account causes higher manufacturing cost.

SUMMARY OF THE INVENTION

The present invention is made to overcome the above mentioned problems. An object of the present invention is to provide an ambient light detector which requires no explanation on a special operation, and can provide ease in design at a low manufacturing cost.

Another object of the present invention is to provide a laser lighting control device using the ambient light detector suitable for a bar code reader, the laser light control device which requires no explanation on a special operation, and can provide ease in design at a low manufacturing cost.

A further another object of the present invention is to provide a bar code reader which requires no explanation on a special operation, and can provide ease in design at a low manufacturing cost.

In order to achieve the above objects, according to claim 1 of the present invention, the ambient light detector is characterized by an ambient light detecting means for detecting an ambient light around a device; and judging means for providing a signal indicating that the ambient light detected by the ambient light detecting means has exceeded a predetermined value for at least predetermined time.

The present invention according to claim 2 is characterized in that the ambient light detecting means includes light detection/conversion means for detecting an ambient light to convert the ambient light into an electrical signal, and amplifying means for amplifying the electrical signal from the light detection/conversion means, and the judging means includes integrating means for integrating a signal from the amplifying means based on a predetermined time constant, comparison reference information producing means for producing comparison reference information based on the signal from the integrating means, and comparing means for comparing the output from the integrating means with the output from the comparison reference information producing means.

The present invention according to claim 3 is characterized in that the integrating means includes a low pass filter which passes a variation rate of a light to be detected and blocks noises due to an ambient light source around the device.

The present invention according to claim 4 is characterized by further including lower limiter means connected to the output of the integrating means, for nullifying the light variation detection when the ambient light is less than the predetermined level.

The present invention according to claim 5 is characterized by further including amplification factor control means which controls an amplification factor of the amplifying means based on the ambient light information around the device.

The present invention according to claim 6 is characterized by further including directivity adding means connected to the light detection/conversion means, for providing the light detection/conversion means with a directional light detection sensitivity.

The present invention according to claim 7 is characterized in that the directivity adding means includes a slit member arranged in front of the light detection/conversion means.

The present invention according to claim 8 is characterized in that the directivity adding means includes a lens arranged in front of the light detection/conversion means.

The present invention according to claim 9 is characterized by further including forcibly outputting means connected to the output of the judging means, to output forcibly a signal corresponding to a signal indicating that the ambient light detected by the ambient light detecting means has changed for at least a predetermined time.

The present invention according to claim 10 is characterized in that the forcibly outputting means outputs forcibly a signal corresponding to a signal indicating that the ambient light detected by the ambient light detecting means is varied for at least a predetermined time when a manual switch means is turned on.

The present invention according to claim 11 is characterized in that the comparison reference information producing means includes an average level operating means for operating an average level of a signal from said integrating means; and output proportionally dividing means for dividing proportionally the output from said average level operating means at a predetermined ratio.

The present invention according to claim 12 is characterized in that the ambient light detecting means includes light detection/conversion means for detecting an ambient light around a device to convert the ambient light into an electrical signal, and amplifying means for amplifying the electrical signal from the light detection/conversion means; and the judging means includes comparison reference information producing means for producing comparison reference information based on a signal from the amplifying means, comparing means for comparing the output of the amplifying means with the output of the comparison reference information producing means, and device ambient noise removing means for nullifying the output thereof when the comparing means produces an output less than a level at which a light to be detected is varied.

The present invention according to claim 13 is characterized by further including lower limiter means connected to the input of the judging means, to nullify a light variation detection when the ambient light level is less than a predetermined value.

The present invention according to claim 14 is characterized by further including amplification factor control means for controlling the amplification factor of the amplifying means based on information on ambient light around a device.

The present invention according to claim 15 is characterized by further including directivity adding means connected to the light detection/conversion means, to provide the light detection/conversion means with a directional light detection sensitivity.

The present invention according to claim 16 is characterized in that the directivity adding means includes a slit member arranged in front of the light detection/conversion means.

The present invention according to claim 17 is characterized in that the directivity adding means includes a lens arranged in front of the light detection/conversion means.

The present invention according to claim 18 is characterized in that the comparison reference information producing means includes an average level operating means for operating an average level of a signal from the amplifying means; and output proportionally dividing means for dividing proportionally the output from the average level operating means at a predetermined ratio.

The present invention according to claim 19 is characterized in that the device ambient noise removing means comprises a shift register.

The present invention according to claim 20 is characterized in that the laser lighting control device suitable for a bar code reader, the laser lighting control device including an ambient light detector, includes an ambient light detector which is formed of an ambient light detecting means for detecting an ambient light around a device, and judging means for producing a signal indicating that the ambient light detected by the ambient detecting means exceeds a predetermined value for at least a predetermined time; and laser lighting control means for controlling the lighting state of the laser in accordance with a result detected by the ambient light detector.

The present invention according to claim 21 is characterized in that the ambient light detecting means includes light detection/conversion means for detecting an ambient light around a device to convert the ambient light into an electrical signal, and amplifying means for amplifying the electrical signal from said light detection/conversion means; and the judging means includes integrating means for integrating a signal from the amplifying means based on a predetermined time constant, comparison reference information producing means for producing comparison reference information based on the signal from the integrating means; and comparing means for comparing the output of the integrating means with the output of the comparison reference information producing means.

The present invention according to claim 22 is characterized in that the integrating means includes a low pass filter which passes a variation rate of light to be detected and blocks noises due to an ambient light source around a device.

The present invention according to claim 23 is characterized by further including lower limiter means for nullifying the light variation detection when said ambient light is less than a predetermined level to the output of the integrating means.

The present invention according to claim 24 is characterized by further including amplification factor control means which controls an amplification factor of the amplifying means based on the ambient light information around a device.

The present invention according to claim 25 is characterized by further including directivity adding means connected to the light detection]conversion means, to provide the light detection/conversion means with a directional light detection sensitivity.

The present invention according to claim 26 is characterized in that the directivity adding means includes a slit member arranged in front of the light detection/conversion means.

The present invention according to claim 27 is characterized in that the directivity adding means includes a lens arranged in front of the light detection/conversion means.

The present invention according to claim 28 is characterized by further including forcibly outputting means connected to the output of the judging means, to output forcibly a signal corresponding to a signal indicating that the ambient light detected by the ambient light detecting means has varied for at least a predetermined time.

According to claim 29, a laser lighting control device suitable for a bar code reader according to claim 28 is characterized in that the forcibly outputting means outputs forcibly a signal corresponding to a signal indicating that an ambient light detected by the ambient light detecting means is varied more than a predetermined time when a manual switch means is turned on.

The present invention according to claim 30 is characterized in that the comparison reference information producing means includes an average level operating means for operating an average level based on a signal from the integrating means; and output proportionally dividing means for dividing proportionally the output from the average level calculating means at a predetermined ratio.

The present invention according to claim 31 is characterized in that the ambient light detecting means includes light detection/conversion means for detecting an ambient light around a device to convert the ambient light into an electrical signal, and amplifying means for amplifying the electrical signal from the light detection/conversion means; and the judging means includes comparison reference information producing means for producing comparison reference information based on a signal from the amplifying means, comparing means for comparing the output of the amplifying means with the output of the comparison reference information producing means, and device ambient noise removing means for nullifying the output thereof when the output of the comparing means is less than a variation in light to be detected.

The present invention according to claim 32 is characterized by further including lower limiter means connected to the input of the judging means, to nullify a light variation detection when the ambient light level is less than a predetermined value.

The present invention according to claim 33 is characterized by further including amplification factor control means for controlling the amplification factor of the amplifying means based on information on ambient light around a device.

The present invention according to claim 34 is characterized by further including the directivity adding means connected to the light detection/conversion means, to provide the light detection/conversion means with a directional light detection sensitivity.

The present invention according to claim 35 is characterized in that the directivity adding means includes a slit member arranged in front of the light detection/conversion means.

The present invention according to claim 36 is characterized in that the directivity adding means includes a lens arranged in front of the light detection/conversion means.

The present invention according to claim 37 is characterized in that the comparison reference information producing means includes average level operating means for operating an average level of a signal from the amplifying means; and output proportionally dividing means for dividing proportionally the output from the average level operating means at a predetermined ratio.

The present invention according to claim 38 is characterized in that the ambient noise removing means includes a shift register.

A laser lighting control device suitable for a bar code reader, the laser lighting control device including an ambient light detector according to claim 39, is characterized by ambient light detector including: optical scanning means arranged between a laser and a bar code for illuminating light from the laser onto the bar code; receiving means for receiving light reflected on the bar code; ambient light detecting means for detecting an ambient light around a device; and judging means for producing a signal indicating that the ambient light detected by the ambient light detecting means has exceeded a predetermined value for at least a predetermined time; and laser lighting control means for controlling the lighting state of the laser in accordance with a result detected by the ambient light detector; the receiving means and the ambient light detector being shared to each other.

The present invention according to claim 40 is characterized by further including means for making the optical scanning means in operation state in no predetermined time reading operation even if the laser is in no operation, and the receiving means and the ambient light detecting means are shared to each other.

According to claim 41, a bar code reader which includes optical scanning means for scanning light from a laser on a bar code and receiving means for receiving light reflected on the bar code, is characterized by an ambient light detector including ambient light detecting means for detecting an ambient light around a device and judging means for providing a signal indicating that the ambient light detected by the ambient light detecting means has exceeded a predetermined value for at least a predetermined time.

According to claim 42, a bar code reader which includes optical scanning means for scanning light from a laser on a bar code and receiving means for receiving light reflected on the bar code, is characterized by an ambient light detector including ambient light detecting means for detecting an ambient light around a device and judging means for providing a signal indicating that the ambient light detected by the ambient light detecting means has exceeded a predetermined value for at least a predetermined time; and laser lighting control means for controlling the lighting state of the laser in accordance with a result detected by the ambient light detector.

Therefore, according to the present invention, the following effects and advantages can be obtained:

(1) With high detection accuracy maintained, a device can be realized at low manufacturing cost. It is unnecessary to explain a special procedure to an operator.

(2) The integrating means formed as a low pass filter can remove noises such as high-frequency light variation from a fluorescent lamp, thus improving the detection accuracy.

(3) The lower limiter means arranged at the output of the integrating means can nullify the light detection when light is put out at a room, for example, at night, thus preventing an erroneous operation due to noises.

(4) The amplification factor control means can effectively perform the light detection, thus contributing to low power consumption and improved device reliability.

(5) The directivity adding means, which provides the light detection sensitivity of the light detection/conversion means with a directivity, can remove a possible detection of an external disturbance light so that the detection accuracy can be improved.

(6) Since the forcibly outputting means is formed as manual switching means, an operator can control advantageously conveniently to perform a fast bar code reading operation.

BRIEF DESCRIPTION OF THE DRAWINGS

FIG. 20 is a block diagram showing a bar code reader.

Figure 1:
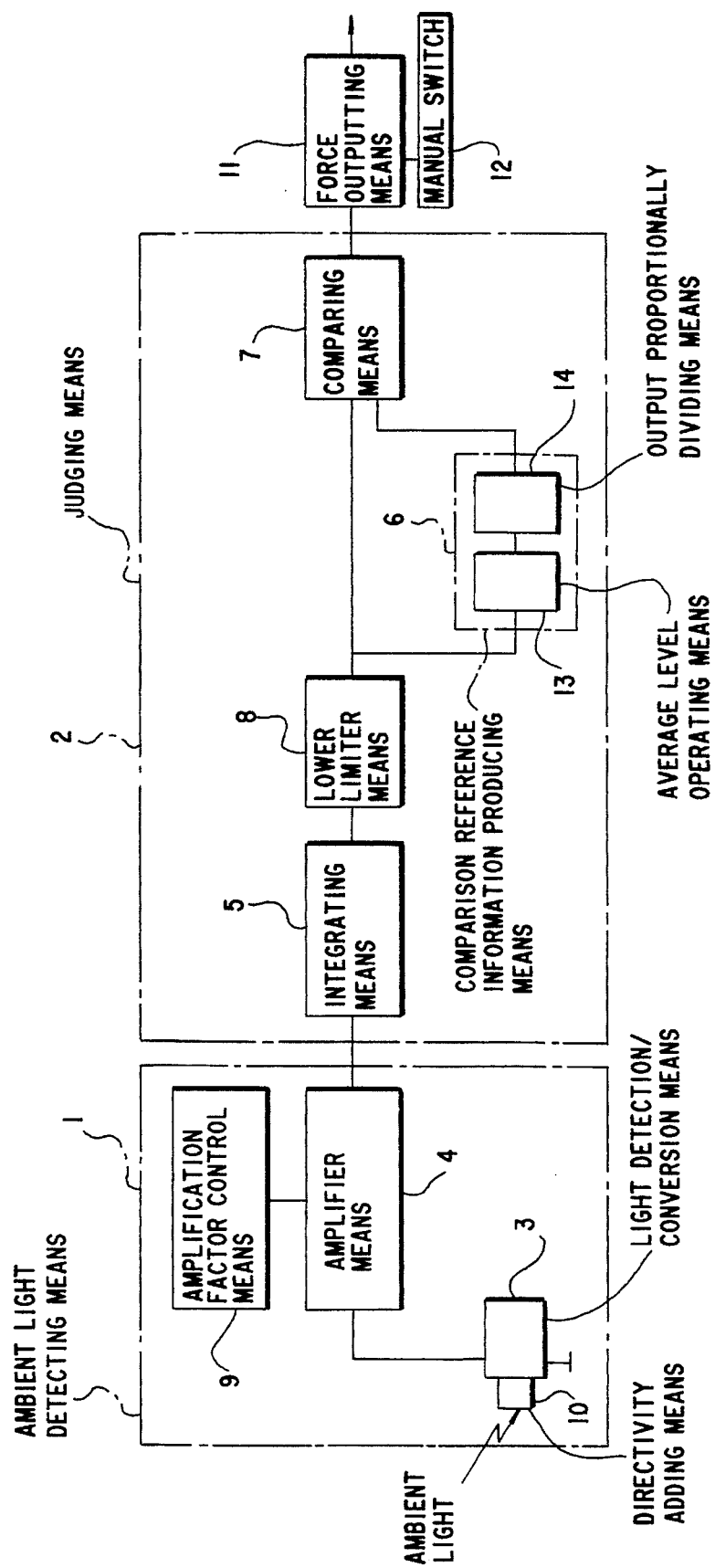
FIG. 1 is a block diagram showing the aspect of the present invention.

DESCRIPTION OF THE PREFERRED EMBODIMENTS (a) The aspect of the invention:

The aspect of the invention will be first explained with reference to attached drawings. Referring to FIG. 1, numeral 1 represents ambient light detecting means. The ambient light detecting means 1 detects an ambient light around an area where a device is arranged.

Numeral 2 represents judging means. The judging means 2 outputs signal indicating that an ambient light detected by the ambient light detecting means 1 has exceeded a predetermined value over a predetermined time.

The ambient light detecting means 1 includes light detection/conversion means 3 and amplifier means 4. The light detection/conversion means 3 detects an ambient light around a device to convert it to an electrical signal. The amplifier means 4 amplifies an electrical signal from the light detection/conversion means 3.

The judging means 2 is formed of integrating means 5 for integrating a signal from the amplifier means 4 with a predetermined time constant, comparison reference information producing means 6 for producing comparison reference information based on a signal from the integrating means 5, and comparing means 7 for comparing the output from the integrating means 5 with the output from the comparison reference information producing means 6.

The integrating means 5 is formed as a low pass filter which passes a variation rate of a light to be detected and blocks noises due to a light source around a device.

Moreover, lower limiter means 8 is connected to the output of the integrating means 5 for nullifying the light conversion detection when the ambient light level is less than a predetermined value.

Amplification factor control means 9 is arranged to control the amplification factor of the amplifier means 4 based on light information around a device.

Directivity adding means 10 for adding a directivity to the light detection sensitivity of the light detection converting means 3 is arranged to the light detection/conversion means 3.

The directivity adding means 10 is formed of a slit member arranged in front of the light detection/conversion means 3.

The directivity adding means 10 is formed of a lens arranged in front of the light detection/conversion means 3.

Forcibly outputting means 11, which forcibly outputs a signal corresponding to the signal indicating that the ambient light detected by the ambient light detection means 1 has varied more than a predetermined time, is arranged to the output of the judging means 2.

The forced outputting means 11 is arranged as means which forcibly outputs a signal corresponding to the signal indicating that an ambient light detected by the ambient light detector 1 is varied more than a predetermined time when the manual switch 12 is turned on.

The comparison reference information producing means 6 is formed of the average level operating means 13 for operating the average level of a signal from the integrating means 5, and output proportionally dividing means 14 for proportionally dividing the output of the average level operating means 13 at a predetermined ratio.

In the present invention shown in FIG. 1, the ambient light detecting means 1 detects an ambient light around the device. The judging means 2 outputs a signal indicating that the ambient light detected by the ambient light detecting means 1 has exceeded a predetermined value for a predetermined time and more.

In detail, the light detection/conversion means 3 in the ambient light detecting means 1 detects an ambient light around the device to convert it into an electrical signal. The amplifier means 4 amplifies an electrical signal from the light detection/conversion means 3.

The integrating means 5 in the judging means 2 integrates a signal from the amplifier means 4 with a predetermined time constant. The comparison reference information producing means 6 produces comparison reference information based on a signal from the integrating means 5. The comparing means 7 compares the output from the integrating means 5 with the output from the comparison reference information producing means 6.

The integrating means 5 passes the variation rate of a light to be detected, but blocks noises due to a light source around a device.

Moreover, the lower limiter means 8 nullifies the light variation detection when the ambient light level is less than a predetermined value.

The amplification factor control means 9 controls the amplification factor based on the ambient light information around a device.

The directivity adding means 10 adds a directivity to the light detection sensitivity of the light detection/conversion means 3.

The forcibly outputting means 11 outputs forcibly outputs a signal corresponding to the signal indicating that an ambient light detected by the ambient light detecting means 1 has varied for a predetermined time and more.

Furthermore, the forcibly outputting means 11 forcibly outputs a signal corresponding to the signal indicating that the ambient light detected by the ambient light detecting means 1 is varied for a predetermined time and more when the manual switching means 12 is turned on.

The average level operating means 13 in the comparison reference information producing means 6 operates the average level of a signal from the integrating means 5. The output proportionally dividing means 14 proportionally divides the output from the average level operating means 13 to a predetermined ratio.

Figure 2:
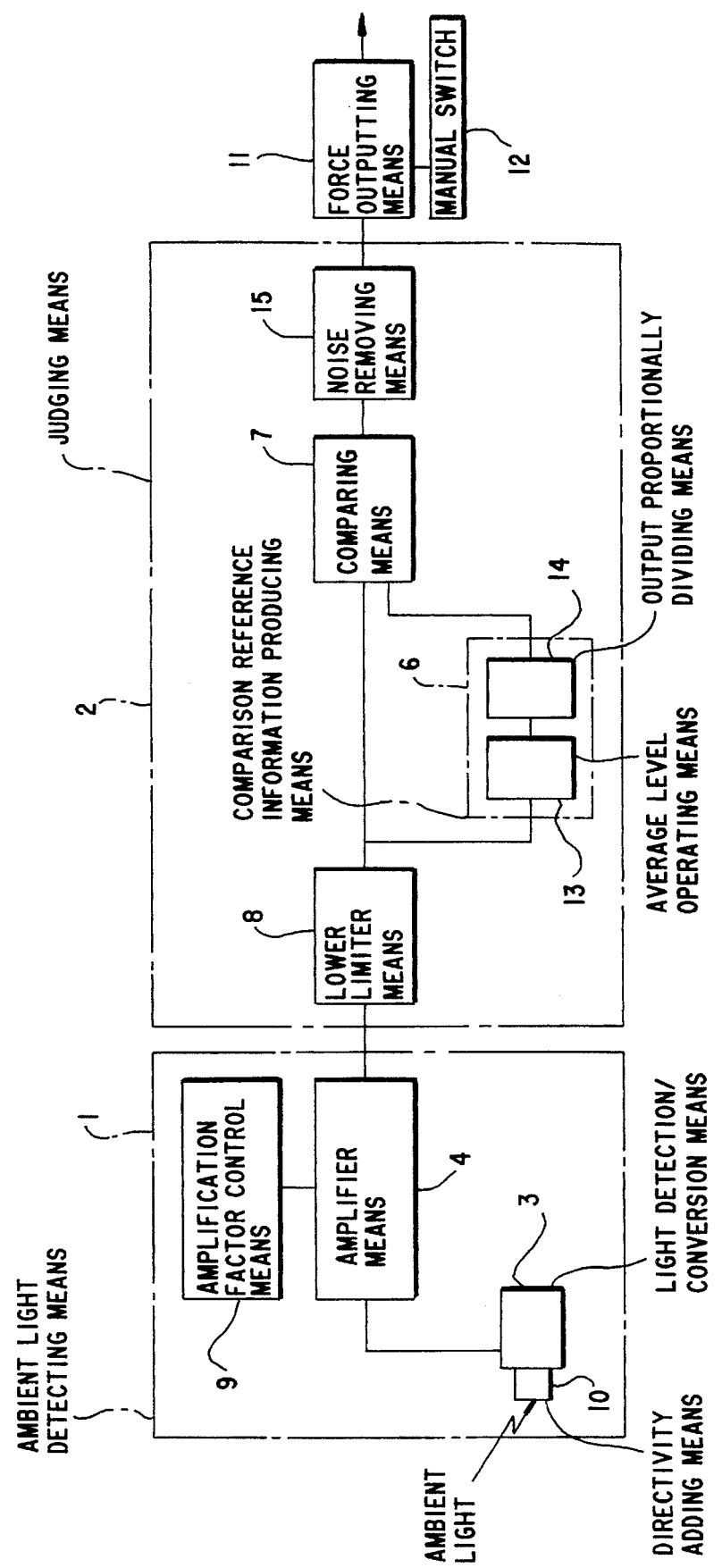
FIG. 2 is a block diagram showing the aspect of the present invention.

FIG. 2 is a block diagram showing an aspect of the present invention. In FIG. 2, numeral 1b represents ambient light detecting means. The ambient light detecting means 1b detects an ambient light around a device. The ambient light detecting means 1b includes light detection/conversion means 3 and amplifying means 4, similar to those in the ambient light detecting means 1 in FIG. 1.

That is, the light detection/conversion means 3 detects an ambient light around a device to convert it into an electrical signal. The amplifying means 4 amplifies an electrical signal from the light detection/conversion means 3.

Numeral 2b represents judging means. The judging means 2b outputs a signal indicating that the ambient light detected by the ambient light detecting means 1b has exceeded the predetermined value for a predetermined time and more. The judging means 2b includes the comparison reference information producing means 6, the comparing means 7, and the device ambient noise removing means 15.

The comparison reference information producing means 6 produces comparison reference information based on a signal from the amplifying means 4. The comparing means 7 compares the output from the amplifying means 4 with the output from the comparison reference information producing means 6. The device ambient noise removing means 15 nullifies the output when the output of the comparing means 7 is less than a light variation to be detected.

The numeral 8 represents lower limiter means. The lower limiter means 8, which is arranged to the input of the judging means 2, nullifies the output when the ambient light level is less than a predetermined value.

Numeral 9 represents amplification factor control means. The amplification factor control means 9 controls the amplification factor of the amplifying means 4 based on the information on an ambient light around a device.

Numeral 10 represents directivity adding means. The directivity adding means 10 is arranged to the light detection converting means 3 to add the directivity of the light detection sensitivity to the light detection converting means 3.

The directivity adding means 10 is formed of a slit member arranged in front of the light detection converting means 3.

The directivity adding means 10 is formed of a lens arranged in front of the light detection converting means 3.

The comparison reference information producing means 6 is constituted of the average level operating means 13 for operating the average level of a signal from the amplifying means 4, and output proportionally dividing means 14 for dividing proportionally the output of the average level operating means 13 to a predetermined ratio.

The device ambient noise removing means 15 is formed as a shift register.

In the present invention in FIG. 2, the ambient light detecting means 1 operates in the manner similar to the embodiment shown in FIG. 1. In the manner similar to that shown in FIG. 1, the judging means 2 outputs a signal indicating that the ambient light detected by the ambient light detecting means 1 has varied to a predetermined value or more over a predetermined time. However, there is a difference in the operation of the main portion.

That is, the comparison reference information producing means 6 produces comparison reference information based on the signal from the amplifying means 4. The comparing means 7 compares the output from the amplifying means 4 with the output from the comparison reference information producing means 6. The device ambient noise removing means 15 nullifies the output when the output of the comparing means 7 is less than a light variation to be detected.

Numeral 8 represents lower limiter means. The lower limiter means is arranged to the input of the judging means 2 to nullify a light variation detection when the ambient light level is less than a predetermined value.

Moreover, in the comparison reference information producing means 6, the average level operating means 13 operates the average level of the signal from the amplifying means 4. The output proportionally dividing means 14 divides proportionally the output from the average level operating means 13 to a predetermined ratio.

Figure 3:
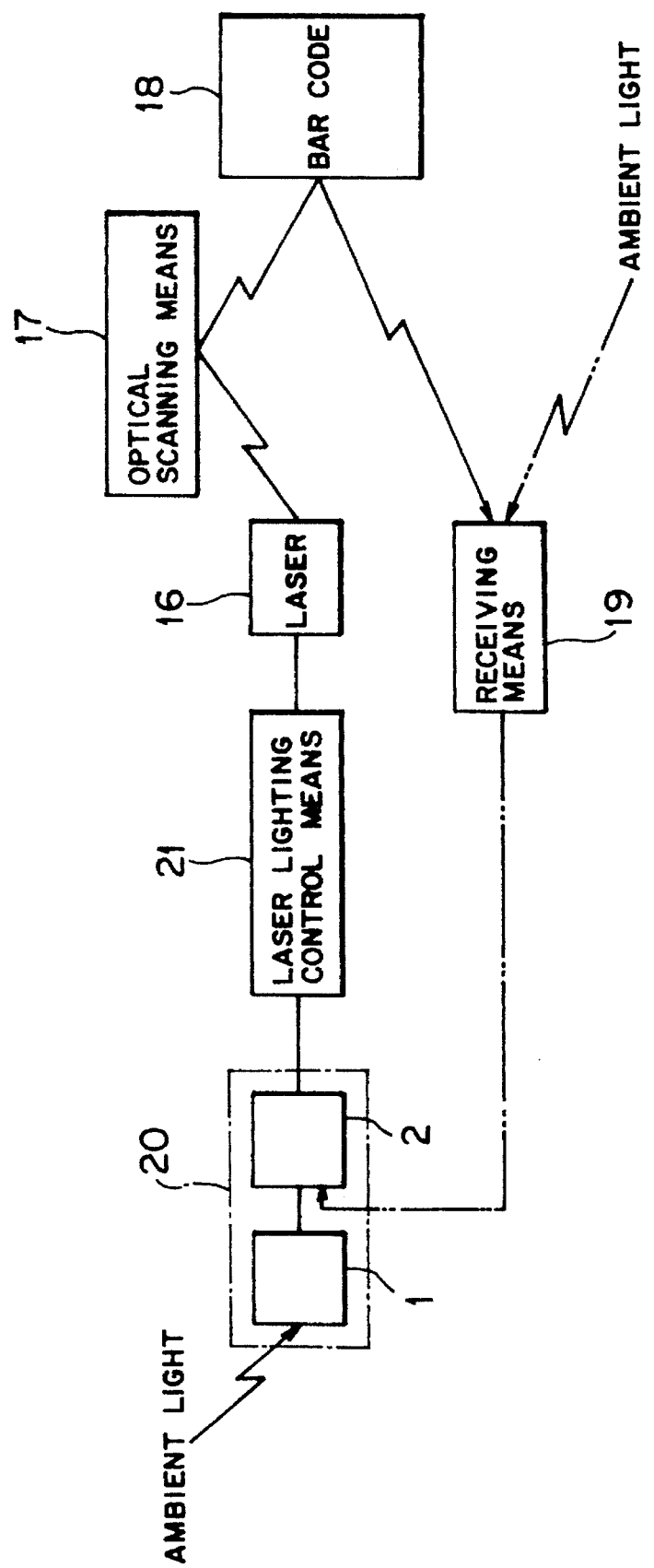
FIG. 3 is a block diagram showing the aspect of the present invention.

FIG. 3 is a block diagram showing an aspect of the present invention. In FIG. 3, numeral 17 represents optical scanning means. The photo scanning means 17 is arranged between the laser 16 and the bar code 18 to illuminate the light emitted by the laser 16 onto the bar code 18.

Numeral 19 represents receiving means. The receiving means 19 receives the light beam reflected on the bar code 18.

Numeral 20 represents an ambient light detector. The ambient light detector 20 is constituted of ambient light detecting means 1 for detecting the ambient light around a device, and judging means 2 for outputting a signal indicating that the ambient light detected by the ambient light detecting means 1 has varied to a predetermined value and more and for a predetermined time and more.

Furthermore, numeral 21 represents laser lighting control means. The laser lighting control means 21 controls the lighting state of the laser 16 in accordance with the result detected by the ambient light detector 20.

Like the ambient light detecting means 1 shown in FIG. 1, the ambient light detecting means 1 is constituted of the light detection converting means 3 for detecting the ambient light around a device that converts an ambient light into an electrical signal, and the amplifying means 4 for amplifying an electrical signal from the light detection converting means 3.

Like the judging means 2 shown in FIG. 1, the judging means 2 is constituted of the integrating means 5 for integrating a signal from the amplifying means 4 with a predetermined time constant, the comparison reference information producing means 6 for producing comparison reference information based on the signal from the integrating means 5, and the comparing means 7 for comparing the output from the integrating means 5 with the output from the comparison reference information producing means 6.

Like that shown in FIG. 1, the integrating means 5 is formed as a low pass filter which passes a variation rate of a light to be detected anti blocks noises due to a light source around a device.

Numeral 8 represents lower limiter means. Like that shown in FIG. 1, the lower limiter 8, which is arranged to the output of the integrating means 5, nullifies the light variation detection when the ambient light level is less than a predetermined value.

Numeral 9 represents amplification factor control means. Like that shown in FIG. 1, the amplification factor control means controls the amplification factor of the amplifying means 4 based on the ambient light information around a device.

Numeral 10 represents directivity adding means. Like that shown in FIG. 1, the directivity adding means 10 adds a directivity to the light detection sensitivity of the light detection converting means 3.

The directivity adding means 10, like that shown in FIG. 1, is formed of a slit member arranged in front of the light detection converting means 3.

Moreover, the directivity adding means 10, like that shown in FIG. 1, is formed of a lens arranged in front of the light detection converting means 3.

Numeral 11 represents forcibly outputting means. The forcibly outputting means 11 is arranged to the output of the judging means 2 to forcibly outputs a signal corresponding to the signal indicating that the ambient light detected by the ambient light detecting means 1 has varied to a predetermined value and more over a predetermined time, like that shown in FIG. 1.

Furthermore, the forcibly outputting means 11 is formed as means which outputs forcibly outputs a signal corresponding to the signal that ambient light detected by the ambient light detecting means 1 is varied over a predetermined time when the manual switch means 12 is turned on.

Like that shown in FIG. 1, the comparison reference information producing means 6 is constituted of the average level operating means 13 for operating the average level of the output of the integrating means 5, and the output proportionally dividing means 14 for dividing proportionally the output of the average level operating means 13 to a predetermined ratio.

Like that shown in FIG. 2, the ambient light detecting means 1 is constituted of the light detection converting means 3 for detecting an ambient light around a device to convert it to an electrical signal, and amplifying means 4 for amplifying the electrical signal from the light detection converting means 3. The judging means 2 is constituted of the comparison reference information producing 6 for producing comparison reference information based on a signal from the amplifying means 4, comparing means 7 for comparing the output from the amplifying means 4 with output from the comparison reference information producing means 6, and the device ambient noise removing means 15 for nullifying the output when the output from the comparing means 7 is less than a light variation to be detected.

Like the lower limiter means 8 shown in FIG. 2, the lower limiter means 8 is arranged to the input of the judging means 2 to nullify the light variation detection when the ambient light level is less than a predetermined value.

Moreover, like the amplification factor control means 9 shown in FIG. 2, the amplification factor control means 9 is arranged to control the amplification factor of the amplifying means 4 based on the ambient light information around the device.

Like the directivity adding means 10 shown in FIG. 2, the directivity adding means 10 is arranged to the light detection converting means 3 to add the directivity to the light detection sensitivity of the light detection converting means 3.

Like the directivity adding means 10 shown in FIG. 2, the directivity adding means 10 is formed of a slit member arranged in front of the light detection converting means 3.

Like the directivity adding means 10 shown in FIG. 2, the directivity adding means 10 is formed of a lens arranged in front of the light detection converting means 3.

Like the comparison reference information producing means 6 shown in FIG. 2, the comparison reference information producing means 6 includes average level operating means 13 for operating the average level of a signal from the amplifying means 4, and output proportionally dividing means 14 for proportionally dividing the output of the average level operating means 13 to a predetermined ratio.

Like the device ambient noise removing means 15 shown in FIG. 2, the device ambient noise removing means 15 is formed of a shift register. The receiving means 19 is shared with the ambient light detecting means 1.

In this case, when there is no predetermined time reading operation, means for making the light scanning means 17 in operation is arranged while the laser 16 does not emit.

In the present invention shown in FIG. 3, the ambient light detecting means 1 detects an ambient light around a device. The judging means 2 outputs a signal indicating that the ambient light detected by the ambient light detecting means 1 has exceeded a predetermined value for a predetermined time and more.

The laser lighting control means 21 controls so as to light the laser 16 in response to the signal. The light scanning means 17 irradiates the light from the laser 16 onto the bar code 18. The receiving means 19 receives the light reflected on the bar code 18.

The ambient light detecting means 1 and the judging means 2 operate in the same way as those shown in FIGS. 1 and 2.

The receiving means 19 operates as the function of the ambient light detecting means. In this case, when there is no predetermined time reading operation, the light scanning means 17 is held in operation while the laser 16 is in no operation.

Figure 4:
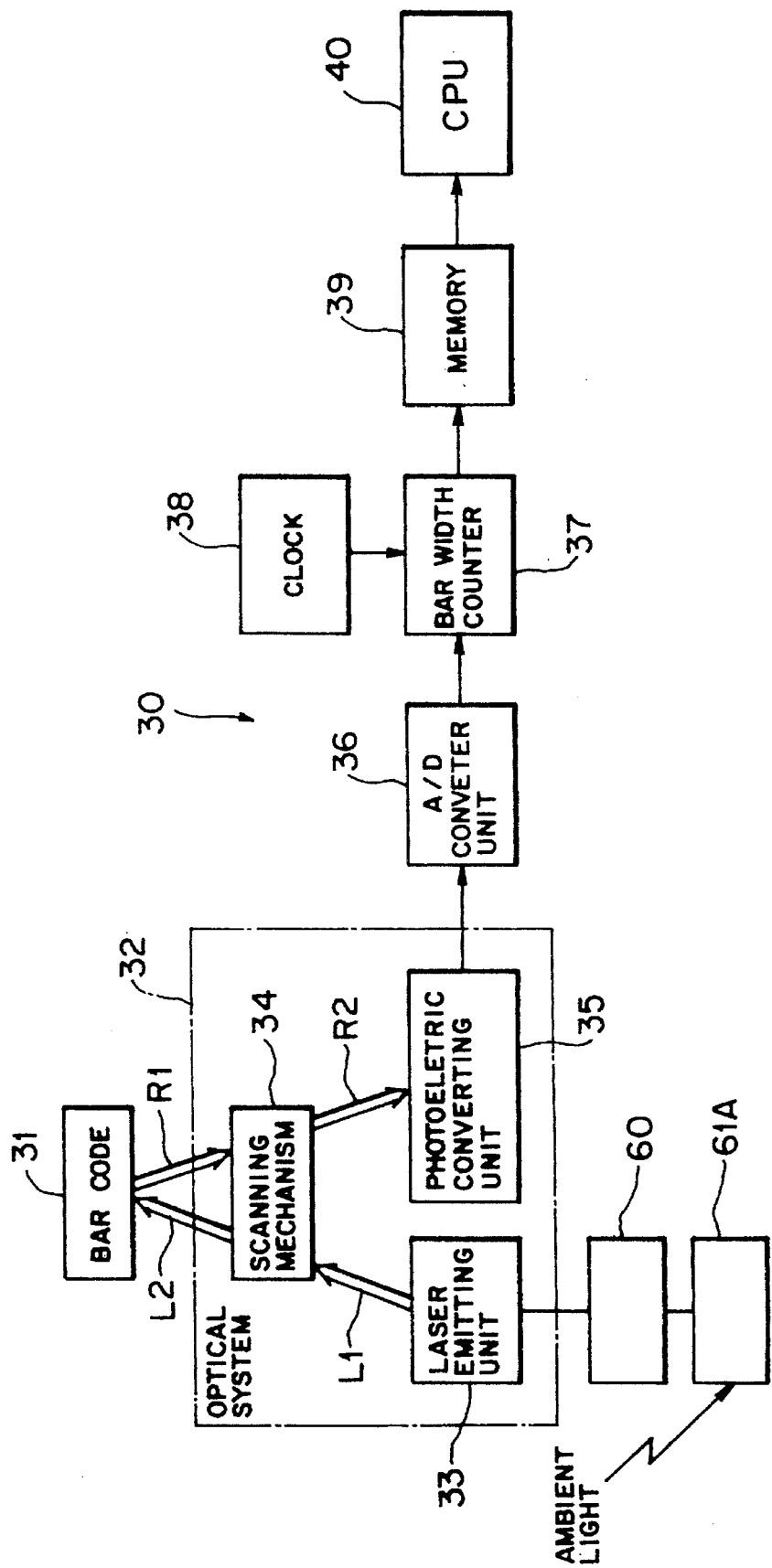
FIG. 4 is a block diagram showing the first embodiment of the present invention.

(b) Embodiment of the Present Invention:

FIG. 4 is a block diagram showing a first embodiment of the present invention. FIG. 4 shows a laser lighting control device (for bar code reader) including an ambient light detector, suited to a bar code reader 30.

Figure 5:
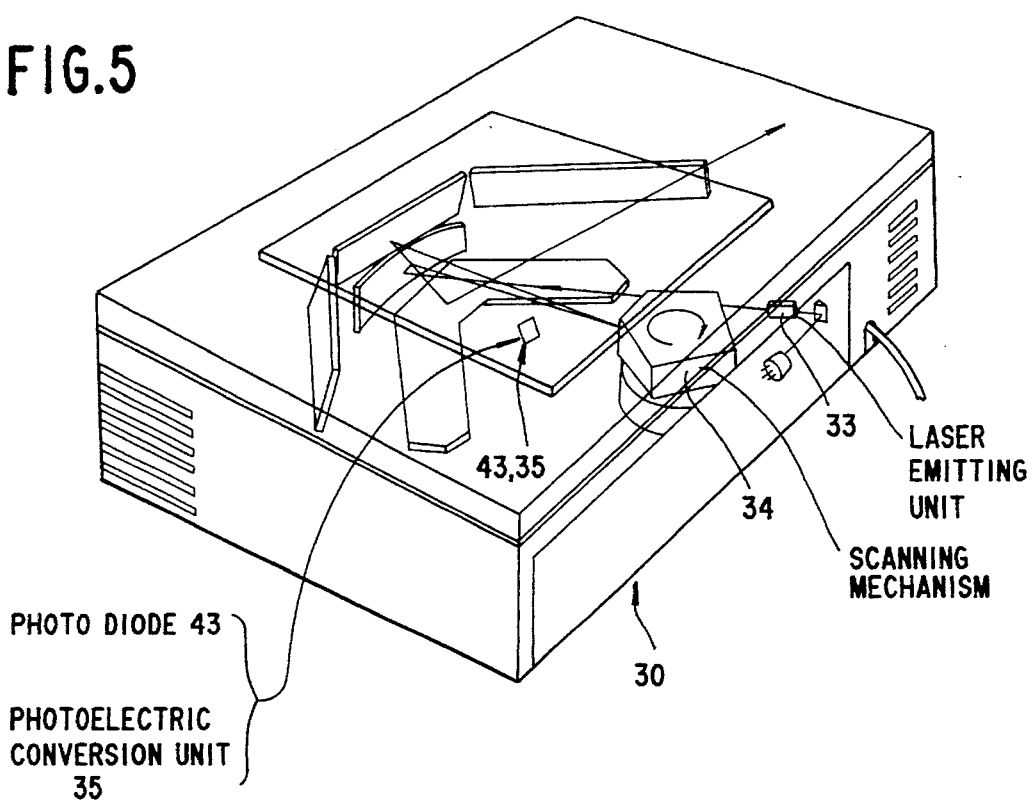
FIG. 5 is a diagram showing an example where an ambient light detector according to the first embodiment of the present invention is mounted on a bar code reader.

Referring to FIG. 4, numeral 61A represents an ambient light detector. The ambient light detector 61A, as shown in FIG. 5, is mounted to the bar code reader 30. The ambient light detector 61A detects an ambient light to activate the bar code reader 30. The ambient light detector (to be explained later) has the detailed structural configuration shown in FIG. 7.

In FIG. 5, numeral 33 represents a laser emitting unit, 34 represents a scanning mechanism (polygon mirror), and 43 represents a photo diode acting as light detection/conversion means.

Numeral 60 represents a laser lighting control unit (or laser lighting control means). When receiving ambient light detection information from the ambient light detection device 61A, the laser lighting control unit 60 controls the lighting state of the laser beam L1 of the laser emitting unit 33 (to be described later).

Numeral 31 represents a bar code printed on the surface of an article or the like. The bar code 31 with plural black bars and white bars arranged usually alternately to each other represents predetermined data based on each black bar width and each white bar width.

An optical system 32 illuminates a laser beam L2 to the bar code 31 and receives a reflection light R1 being a laser beam L2 reflected from the bar code 31. The optical system 32 is constituted of a laser emitting unit (laser) 33, a scanning mechanism (optical scanning means) 34, and a photoelectric conversion unit (receiving means) 35.

The laser emitting unit 33 includes a semiconductor laser for emitting the laser beam L1. The laser emitting unit 33 is on/off controlled by the laser lighting control unit 60.

The scanning mechanism 34 is constituted of a polygon mirror driven rotatably by, for example, a motor. The scanning mechanism 34 reflects a laser beam L1 as a laser beam L2 from the laser emitting unit 33 and irradiates the laser beam L2 to plural black bars and plural white bars forming the bar code 31 while it travels and scans the laser beam at a fixed rate and perpendicular to the black bars and white bars of the bar code 31.

The scanning mechanism 34 reflects the reflection light R1 being a laser beam L2 reflected on the bar code 31 and transmits the reflection light R1 as a reflection light R2 to the photoelectric conversion unit 35, while the reflection light R1 moves with the laser beam L2 scanned.

Figure 6:
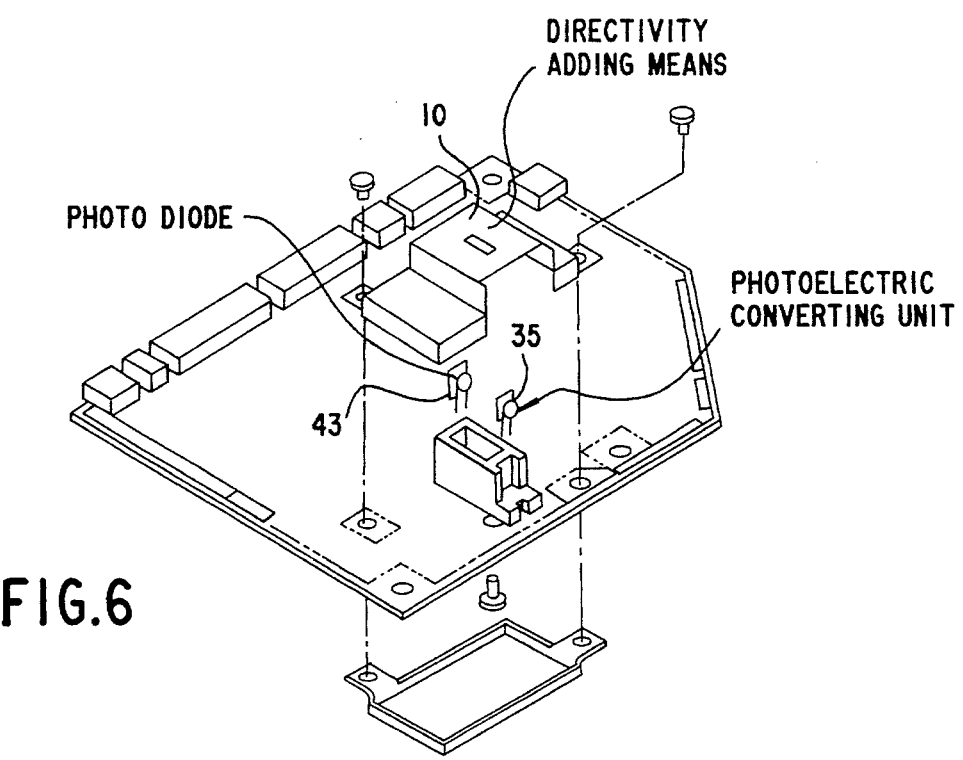
FIG. 6 is a diagram showing an example where an ambient light detector according to the first embodiment of the present invention.

The photoelectric conversion unit 35, which includes a photoelectric conversion element such as a photo diode, is mounted to the bar code reader 30, as shown in FIGS. 5 and 6. The photoelectric conversion unit 35 reflects the reflection light (light input signal) R2 via the scanning mechanism 34 and converts it to an electrical signal (analog value) according to the light amount thereof.

Numeral 36 represents an A/D converter unit (binary device) for digitizing to an electrical signal from the photoelectric converting unit 35. The A/D converter unit 36 converts an electrical signal from the photoelectric converting unit 35 into a binary signal including a black level signal corresponding to each black portion and a white level signal corresponding to each white portion of the bar code 31. As for the binary signal, the white level signal represents a high level and the black level signal represents a low level because the light amount of the light R2 reflected by each white bar portion is larger than that of the light R2 reflected by each black bar portion in the binary signal.

The bar width counter 37 counts a clock signal from the clock generator 38. The bar width counter 37 outputs, as a count value of a clock signal, the time width corresponding to the black level signal portion and the white level signal portion of the binary signal from the A/D converter unit 36, or the value corresponding to each black bar and each white bar of an actual bar code 31.

Numeral 39 represents a memory for storing a bar code count value from the bar width counter 37. The CPU 40 extracts and demodulates predetermined data of the bar code 31 based on the bar width count value (values corresponding to each black bar width and each white bar width) stored in the memory 39.

Next, a detailed explanation of the ambient light detector 61A will now be made.

Figure 7:
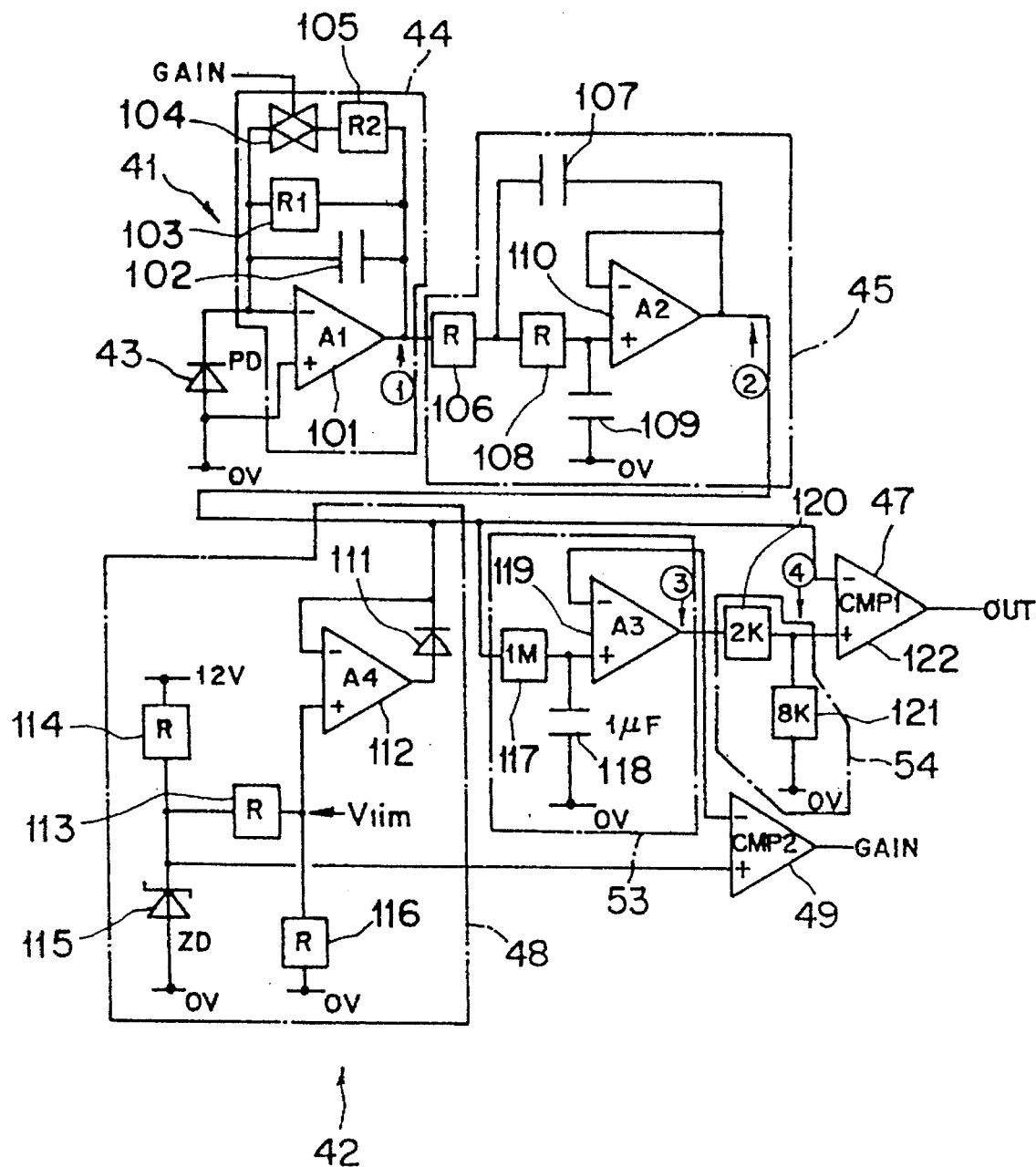
FIG. 7 is a block diagram showing in detail an ambient light detector of the first embodiment according to the present invention.

FIG. 7 is a diagram showing in detail the ambient light detector according to the present embodiment.

Referring to FIG. 7, numeral 41 represents an ambient light detector (ambient light detecting means). The ambient light detector 41 detects an ambient light around a device. The ambient light detector is formed of a photo diode (photo detection/conversion means) 43 and the amplifier unit (amplifying means) 44.

The photo diode 43 is mounted to the bar code reader 30, as shown in FIGS. 5 and 6. The photo diode 43 detects an ambient light around an area where the ambient light detector are arranged to convert it to an electrical signal. As shown in FIGS. 5 and 6, the photo diode 43 can be arranged near to the photoelectric converting unit 35.

Figure 10:
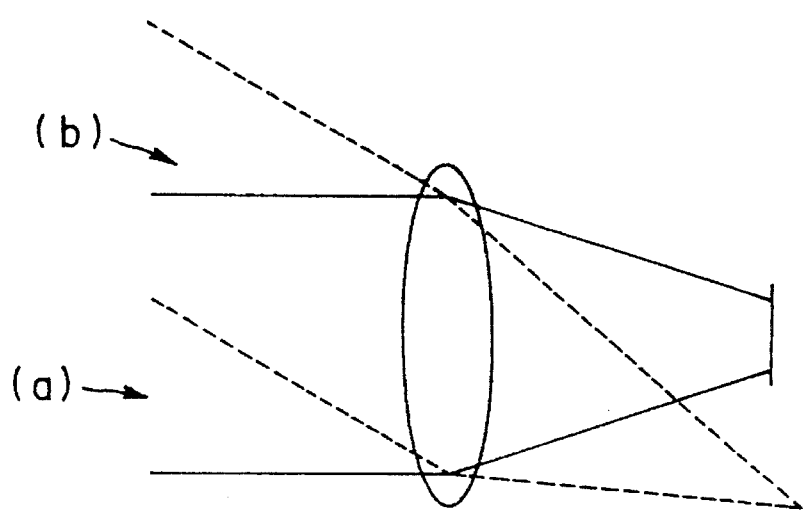
FIG. 10 is a diagram explaining the reading directivity of the optical detection/conversion unit.

As shown in FIG. 6, a slit member (or the lens 10B shown in FIG. 10) 10A as directivity adding means 10 is arranged in front of the photo diode 43. The slit member 10A or the lens 10B provide the photo diode 43 with a directional photo detection sensitivity to remove a disturbance light detection, thus improving the detection accuracy.

Figure 8:
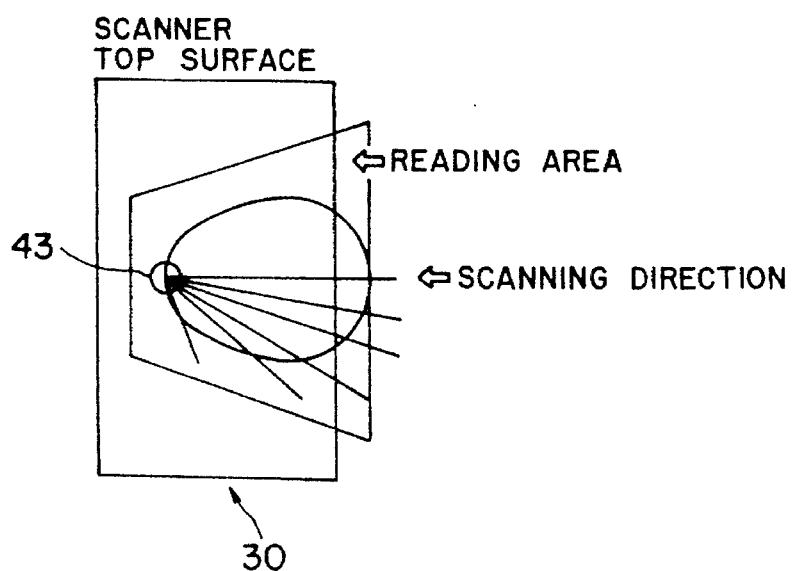
FIG. 8 is a diagram explaining the reading directivity of the optical detection/conversion unit.
Figure 9:
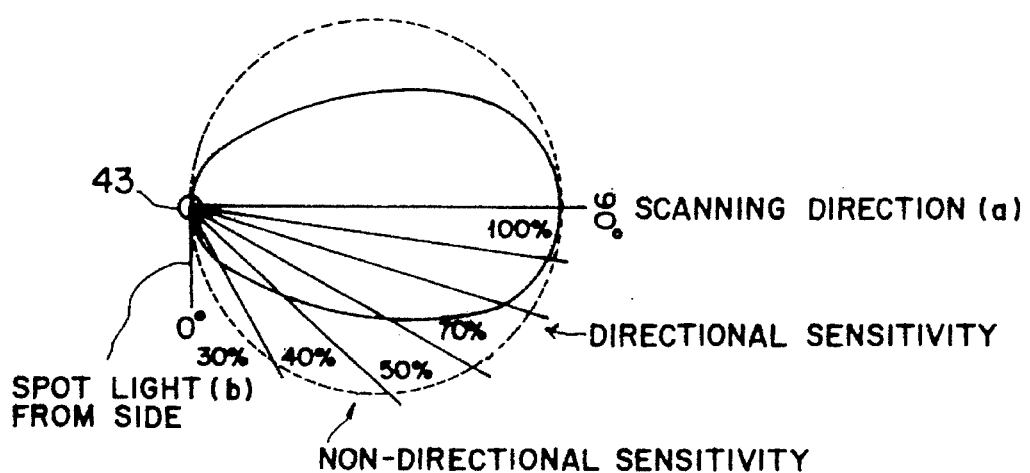
FIG. 9 is a diagram explaining the reading directivity of the optical detection/conversion unit.

That is, when the slit member 10A is arranged in front of the photo diode 43, a directivity is provided only to the laser illuminating or reading direction within the bar code reading area of the bar code reader 30, as shown in FIGS. 8 and 9. Thus since a variation in light in the scanning direction (in the direction a shown in FIGS. 8 and 9) is detected, the influence of the spot light in the horizontal direction (in the direction b shown in FIGS. 8 and 9) can be removed.

When the lens 10B is arranged in front of the photo diode 43, light is irradiated only in the scanning direction (in the direction a shown in FIG. 10) so that the influence of the spot light in the horizontal direction (in the direction b shown in FIG. 10) can be removed.

The amplifier unit 44 amplifies an electrical signal, or a detection signal corresponding to an ambient light around a device, converted by the photo diode 43. The amplifier unit 44 includes an amplifier 101, a capacitor 102, resistors 103 and 105, and an analog switch 104.

The numeral 42 represents judging unit (judging means). The judging unit 42 can output a signal indicating that the ambient light detected by the ambient light detecting unit 41 has exceeded a predetermined value or more over a predetermined time. The judging unit 42 includes an integrating unit (integrating means) 45, a lower limiter unit (lower limiter means) 48, a comparator (comparing means) 47, and a comparison reference information producing unit (comparison reference information producing means) 46.

The integrating unit 45 integrates a signal from the amplifier unit 44 with a predetermined time constant. That is, the integrating unit 45 is formed as a low pass filter which passes a light variation rate to be detected and blocks noises (high-frequency components) due to a light source (for example, a fluorescent lamp in a room) around a device so that the detection accuracy is improved.

That is, a two-stage low pass filter is constituted of resistors 106 and 108, capacitors 107 and 109, and an amplifier 110.

The low limiter unit 48 is connected to the output of the integrating unit 45. The lower limiter unit 48 nullifies the light variation detection when an ambient light is less than a predetermined value to prevent an erroneous operation due to noises. The lower unit 48 is formed of a diode 111, an amplifier 112, resistors 113 and 114, a Zener diode 115, and a resistor 116.

That is, the resistors 113, 114 and 116, and the Zener diode 115 set a voltage (Vlim) of a predetermined value corresponding to the lower ambient light level. The diode 111 and the amplifier 112 nullifies a photo variation detection when an ambient light level is less than a predetermined value. The integrating unit 45 produces an output signal without any change when the ambient light level is more than a predetermined value.

The voltage, with a predetermined value corresponding to the ambient light level, is set based on a detectable minimum light amount. Moreover, the comparison reference information producing unit 46 produces a comparison reference information based on the signal from the integrating unit 44. The comparison reference information producing unit 46 is formed of an average level operating unit 53 and a proportionally dividing unit 54.

The average level operating unit 53 operates the average level of an ambient light level signal input from the integrating unit 45 via the lower limiter unit 48 to output the result as a slice signal to the proportionally dividing unit 54. The average level operating unit 53 is formed of a resistor 117, a capacitor 118, and an amplifier 119.

That is, the resistor 117 or the capacitor 118 determines an average operation setting (slice level setting) of the slice signal for the average level operating unit 53. In this case, the resistor 117 is 1 MΩ, and the capacitor 118 is 1 µF.

The proportionally dividing unit 54 divides proportionally the slice signal from the average level operating unit 53 to a predetermined ratio. The proportionally dividing unit 54 is formed of resistors 120 and 121. In this case, a voltage division can be performed to a predetermined ratio by means of the resistor 120 of 2 KΩ and the resistor 121 of 8 KΩ.

Moreover, in order to determine the judgment criterion to a variation in a predetermined ratio of the ambient light, the average level operating unit 53 sets the slice level. For example, the slice level is set within 80% of the ambient light level, a variation in ambient light over 20% becomes comparison reference information. That is, the slice level can set the detection sensitivity to a variation in ambient light.

The comparator 47 compares a signal from the integrating unit 45 with a signal from the proportionally dividing unit 54 to output the comparison result. As a result, a change in ambient light due to an operator's bar code reading operation is detected.

The comparator (amplification factor control means) 49 controls the amplification factor of the amplifying unit 44 based on the light information around an area where a device is arranged, thus contributing to a power consumption and an improved device reliability.

More particularly, the comparator 49 compares a Zener diode voltage produced based on a predetermined voltage (Vlim) produced in the lower limiter unit 48 with an amplification voltage from the amplifier 119 in the average level operating unit 53. The comparator 49 outputs an high level signal to the analog switch 104 in the amplifying unit 44, when the amplification voltage is more than the Zener diode voltage. The comparator 49 outputs a low level signal to the analog switch 104 in the amplifying unit 44, when the amplification voltage is less than the Zener diode voltage.

When the analog switch 104 receives a high level signal from the comparator 49, the resistor 105 becomes an onstate, whereby the amplification factor of the amplifier 101 increases. When the analog switch 104 receives a low level signal from the comparator 49, the resistor 105 becomes an off-state, whereby the amplification factor of the amplifier 101 decreases. Hence, excessive amount of incident light, which saturates the circuit when a direct light hits, can be prevented.

With respect to the above structural arrangement, the operation of the present device will be described below with reference to FIGS. 4, 7, and 11.

In FIG. 4, the ambient light detector 61A detects an ambient light around a device. When it is judged that a variation in ambient light is due to an operator's bar code reading operation, the laser lighting control unit 60 controls the laser emitting unit 33 to illuminate the laser beam L1 to the bar code 31 via the scanning mechanism 34.

As for the ambient light entering the ambient light detector 61A, the slit member or lens acting as directivity adding means can remove its directivity of the photo detection sensitivity, or the influence of the spot light in the horizontal direction.

The photo diode 43 converts an ambient light entering through the slit member 10A or lens 10B into an electrical signal corresponding to the light amount of an ambient light.

The amplifying unit 44 amplifies an electrical signal converted in the photo diode 43 or a detection signal corresponding to the ambient light around a device to output the result to the integrating unit 45.

Figure 11:
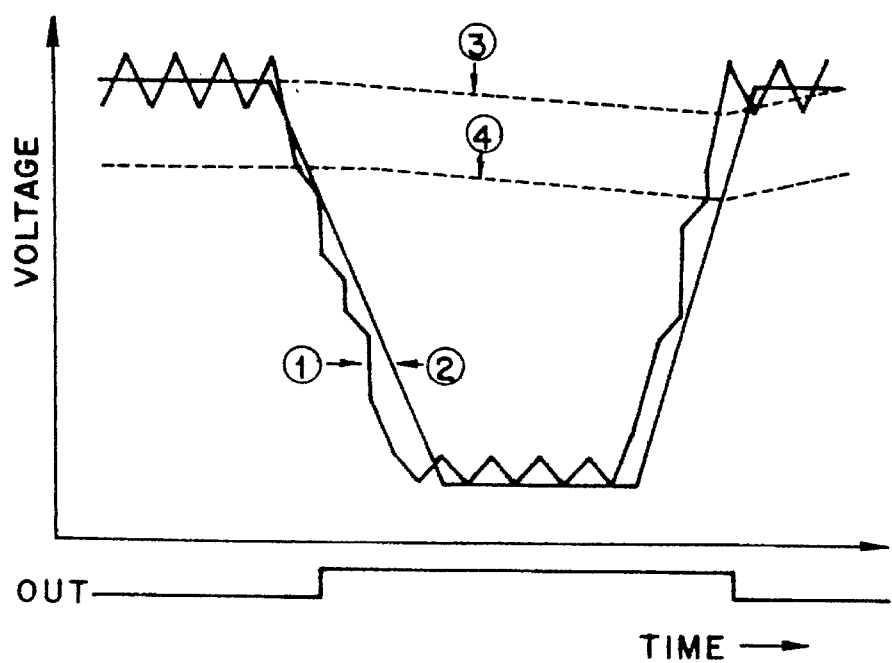
FIG. 11 is a diagram explaining the operation of the ambient light detector according to the first embodiment of the present invention.

For example, the amplifying unit 44 outputs an electrical signal shown with (1) in FIG. 11. In FIG. 11, the horizontal axis represents time and the vertical axis represents a voltage which increases and decreases in accordance with the amount of incident light.

The integrating unit 45 inputs an electrical signal and passes the light variation rate to be detected to the comparator 47 and the lower limiter unit 48, but blocks noises (the high-frequency components of the variation rate) due to an ambient light source (for example, a fluorescent lamp in a room) around a device.

When the ambient light level is lower than a predetermined value based on a detectable minimum light amount, the lower limiter unit 48 passes the signal from the integrating unit 45 to the outputs of the comparator 47 and the average level operating unit 53. When the ambient light level is lower than a predetermined value, the light variation detection is nullified to avoid an erroneous operation due to noises.

For example, the integrating unit 45 cuts the high frequency component of the signal (1) from the amplifying unit 44 shown in FIG. 11. Then the lower limiter unit 48 outputs the signal (2) shown in FIG. 11.

The average level operating unit 53 operates the average level of its input signal to output the outcome as a slice signal to the proportionally dividing unit 54. The proportionally dividing unit 54 divides proportionally the slice signal from the average level operating unit 53 to a predetermined ratio.

That is, the average level operating unit 53 cuts the signal (shown with (2) in FIG. 11) from the lower limiter 48 as a slice level (shown with broken line (3) in FIG. 11). Then the proportionally dividing unit 54 proportionally divides the outcome to the level (as shown with broken line (4) in FIG. 11).

The comparator 47 compares the signal from the integrating unit 45 with the signal from the proportionally dividing unit 54 to output the comparison result, whereby a variation in ambient light due to an operator's reading operation is detected.

That is, when the signal is lower than that shown with the broken line (4), the comparator 47 outputs a high level signal indicating that an operator is performing a bar code reading operation. When the signal is higher than that shown with broken line (4), the comparator 47 outputs a low level signal indicating that an operator's bar code reading operation is not performed.

Namely, the high level signal from the comparator 47 becomes a control signal for making the laser emitting unit 33 to emit the laser beam L1.

The comparator (amplification factor control means) 49 compares the Zener diode voltage produced based on the predetermined voltage (Vlim) in the lower limiter unit 48 with the amplification voltage from the amplifier 119 in the average level operating unit 53.

When the amplification voltage is larger than the Zener diode voltage, it is judged that the amount of the light falling onto the photo diode 43 is excessive so that a high level signal is outputted to the analog switch 104 to decrease the amplification factor of the amplifier 101. When the amplification voltage is lower than the Zener diode voltage, a low level signal is outputted to the analog switch 105 to increase the amplification factor of the amplifier 101.

In the laser lighting control device with the ambient light detector shown in FIG. 4 for a bar code reader, the comparator 47 in FIG. 7 outputs a control signal to make the laser emitting unit 33 to emit the laser beam L1.

The laser emitting unit 33 emits a laser beam L1 in response to the control signal. The scanning mechanism 34 irradiates the laser beam L1 as the laser beam L2 onto the black bars and white bars of the bar code 31 while it travels and scans at a fixed rate and in the direction perpendicular to the black bars and white bars of the bar code 31.

The laser beam L2 from the scanning mechanism 34 reflects scatteringly on the portion of the bar code 31 and then re-enters as the reflection light R1 to the scanning mechanism 34. The reflection light R1 varies its reflection angle as the laser beam L2 is scanned. When the reflection light R1 is reflected by the polygon mirror constituting the scanning mechanism 34, it enters as the reflection light R2 onto the photoelectric conversion element in the photoelectric converting unit 35 arranged at a predetermined position.

The photoelectric converting unit 35 converts the reflection light R2 into an electrical signal corresponding to the light amount thereof. The A/D converter digitalizes the electrical signal to a binary signal including a black level signal corresponding to each black bar portion of the bar code 31 and a white level signal corresponding to each white bar portion of the bar code 31.

After the A/D converter unit 36 digitalizes to a digital signal as a binary signal, the bar width counter 37 counts the clock signal from the clock generator 38. As a result, the time widths (values corresponding to the widths of each black bar and each white bar of an actual bar code 31) of the black level signal portion and the white level signal portion of the binary signal from the A/D converter unit 36 are measured. The count value is temporarily stored in the memory 39. The CPU 40 subjects the bar width count value stored in the memory 39 to a predetermined process to extract and demodulate the predetermined data of the bar code 31.

As described above, in the laser lighting control device for a bar code reader, the device using the ambient light detector according to the first embodiment of the present invention, the ambient light detector is formed of the ambient light detecting unit 41 for detecting an ambient light around a device, and the judging unit 42 for outputting a signal indicating that the ambient light detected by the ambient light detecting unit 41 has exceeded a predetermined value over a predetermined time. This simplified configuration can realize a higher detection accuracy, a low manufacturing cost, and an automatic operation. Hence, there is an advantage in that no explanation on special operation is needed to an operator.

The integrating unit 45, which is formed of a low pass filter, can remove noises due to a variation in a light of high frequency from, for example, a fluorescent lamp. Thus, the detection accuracy of the integrating unit 45 is improved.

The lower limiter unit 48 connected to the output of the integrating unit 45 nullifies the light detection, for example, when a lamp is turned off in a room at night. There is an advantage in that an erroneous operation due to noises can be avoided.

The comparator 49, which controls the amplification factor of the amplifying unit 44, can effectively execute the light detection, thus contributing to power consumption saving and improved device reliability.

Moreover, since the slit member 10A or the lens 10B has a directional light detection sensitivity, there is an advantage in that the disturbance light detection can be removed and the detection accuracy can be improved.

In the ambient light detector according to the present embodiment, the output signal from the comparator 47 is used as a control signal to the laser emitting unit 33 without any change. According to the present invention, when an operator operates continuously the bar code reader, means (forcibly outputting means) for producing a control signal with which the laser emitting unit 33 is forced to emit the laser beam L1 may be arranged for the operator's convenience.

Figure 12:
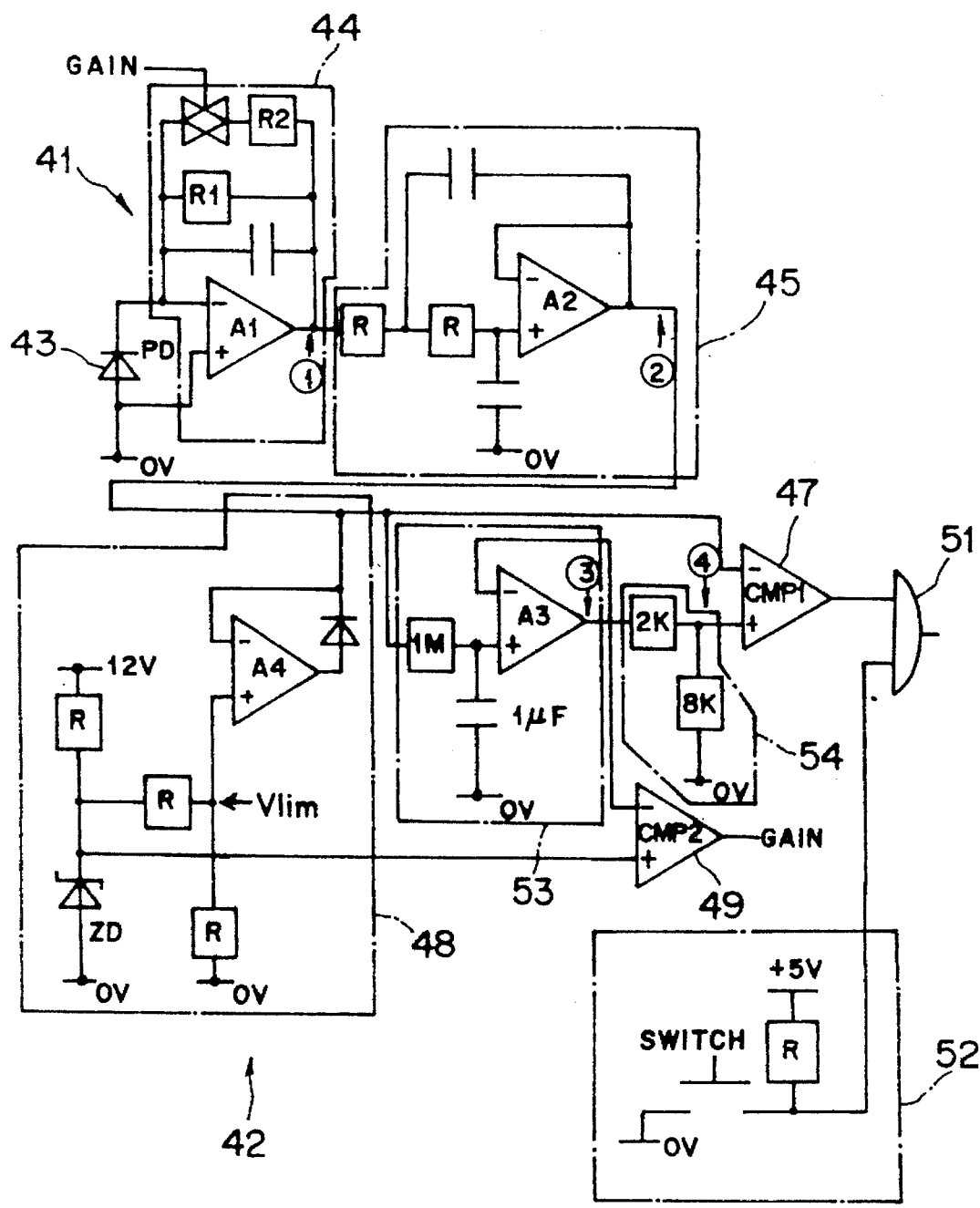
FIG. 12 is a block diagram showing another modification according to the first embodiment of the present invention.

In this case, in the ambient light detector, as shown in FIG. 12, an OR circuit 51 connected to the output of the comparator 47 as well as a manual switch (means) 52 operated by an operator are arranged in the ambient light detector as shown in FIG. 7. When an operator turns on the manual switch 52, the OR circuit 51 outputs a high level signal so that a signal is forcibly outputted which corresponds to the signal indicating that the ambient light signal detected by the ambient light detector 41 has varied more than a predetermined time.

That is, the forcibly outputting means is formed of the OR circuit 51 and the manual switch 52.

Furthermore, in the ambient light detector in the present embodiment, the integrating unit 45 formed of a low pass filter removes noises (high frequency components in variation rate) due to a light source (for example, a fluorescent lamp in a room) around a device, the noises being included in an electrical signal converted by the photo diode 43. However, according to the present invention, means (device ambient noise removing means) which nullifies the output with one less than a desired light detection level may be arranged to the output of the ambient light detector.

Figure 13:
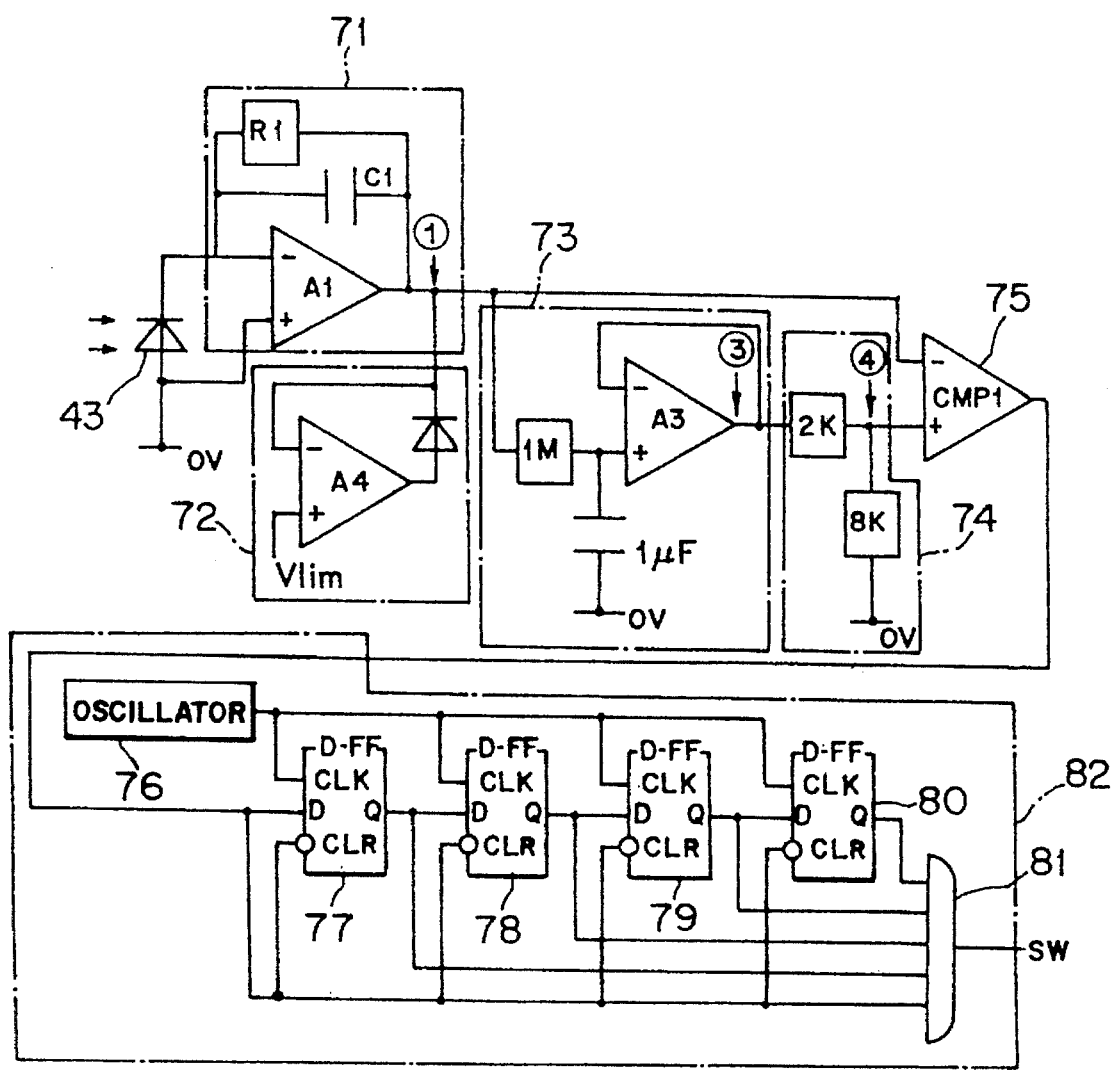
FIG. 13 is a block diagram showing another modification according to the first embodiment of the present invention.

In this case, the ambient light detector, as shown in FIG. 13, has the function similar to that shown in FIG. 7. The ambient light detector includes a photo diode 43 acting as the light detection converting means, an amplifier 71 as amplifying means, a lower limiter unit 72 acting as lower limiter means, an average level operating unit 73 acting as average level operating means, a proportionally dividing unit 74 acting as proportionally dividing means, and a comparator 75 acting as comparing means, and a device ambient noise removing unit 82 acting as device ambient noise removing means.

Therefore, the ambient light detector shown in FIG. 13 is different from that shown in FIG. 7 in that there are no integrating unit connected to the output of the amplifying unit 71 and no amplification factor control unit acting as amplification factor control means, but the device ambient noise removing unit 82 is connected to the output of the comparator 75.

The device ambient noise removing unit 82 nullifies the output less than a light variation to be detected. The device ambient noise removing unit 82 is a shift register which is formed of an oscillator 76 for generating a clock signal of, for example, 100 Hz, four D-type flip-flops 77 to 80 for receiving the clock signal, and an AND circuit 81 for receiving data stored in each of the flip-flops 77 to 80.

That is, with the light variation (50 to 120 Hz) of a fluorescent lamp inputted to the device ambient noise removing unit 82, the AND circuit 81 does not produce a high level output signal if a high level signal is not continuously outputted over 40 msec (10 msec×4). This allows the light variation of high frequency of more than 25 Hz to be removed as a device ambient noise.

In the ambient light detector shown in FIG. 13, the output signal from the device ambient noise removing means 82 is used as the control signal to the laser emitting unit 33 without any change. However, according to the present invention, the ambient light detector has means (forcibly outputting means) for producing a control signal which forcibly outputs the laser emitting unit 33 to emit the laser beam L1, like the device shown in FIG. 12.

Figure 14:
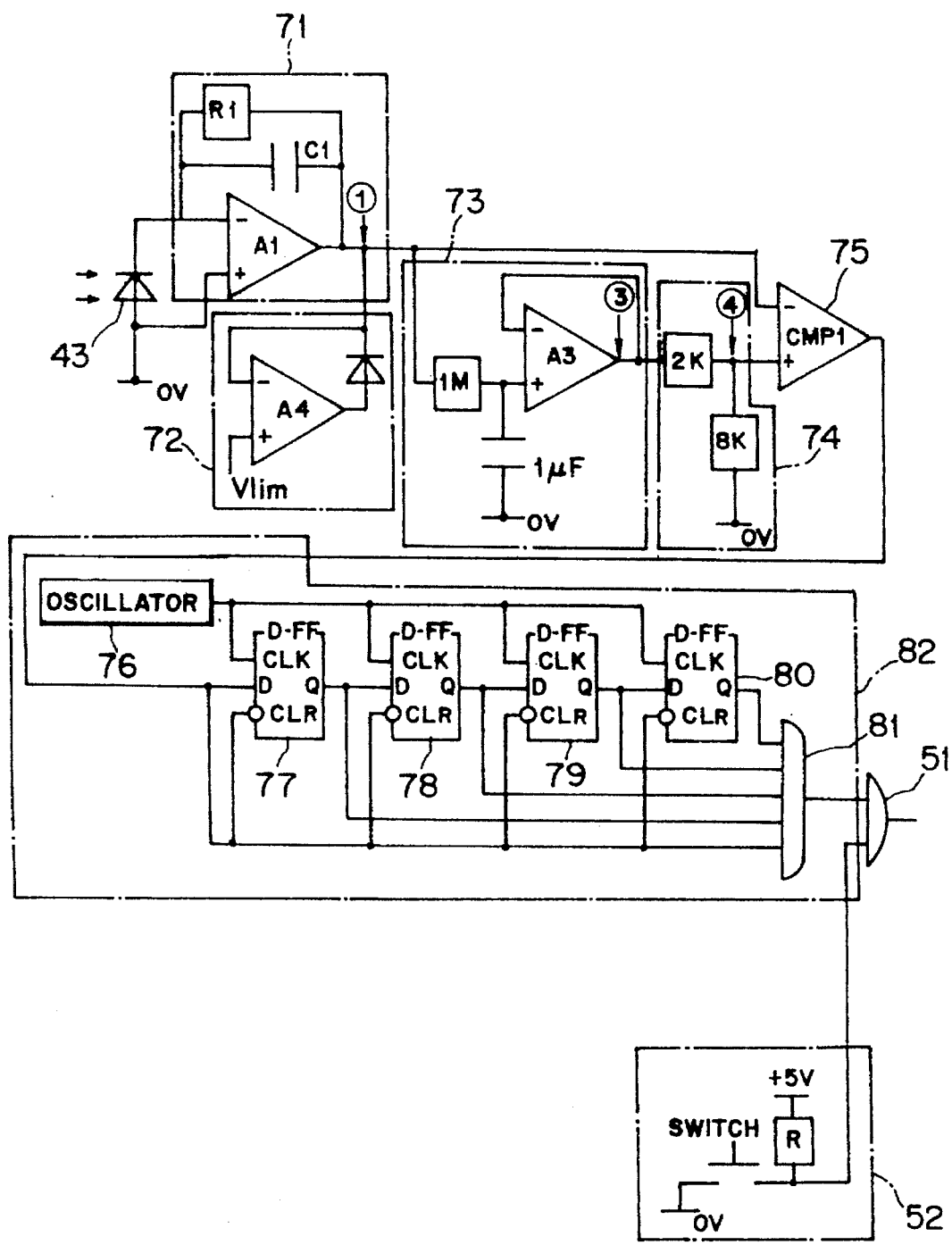
FIG. 14 is a block diagram showing another modification according to the first embodiment of the present invention.

In this case, the ambient light detector, as shown in FIG. 14, includes the photo diode 43 acting as light detection/conversion means, the amplifying unit 71 acting as amplifying means, the lower limiter unit 72 acting as lower limiter means, the average level operating unit 73 acting as average level operating means, proportionally dividing unit 74 acting as proportionally dividing means, the comparator 75 acting as comparing means, and device ambient noise removing unit 82 acting as device ambient noise removing means. These elements have the same function as those shown in FIG. 13. The ambient light detector. The ambient light detector further includes the OR circuit 51 acting as forcibly outputting means, and the manual switch 52, as shown in FIG. 12.

In the above structural arrangement, when an operator operates the manual switch 52, a signal is forcibly outputted, which corresponds to the signal indicating that the ambient light detected by the photo diode 43 has varied for a predetermined time and more.

As described above, the ambient light detector shown in FIGS. 13 and 14 does not include the comparator 49 acting as amplification factor control means. According to the present invention, the comparator can be used in the ambient light detector.

Figure 15:
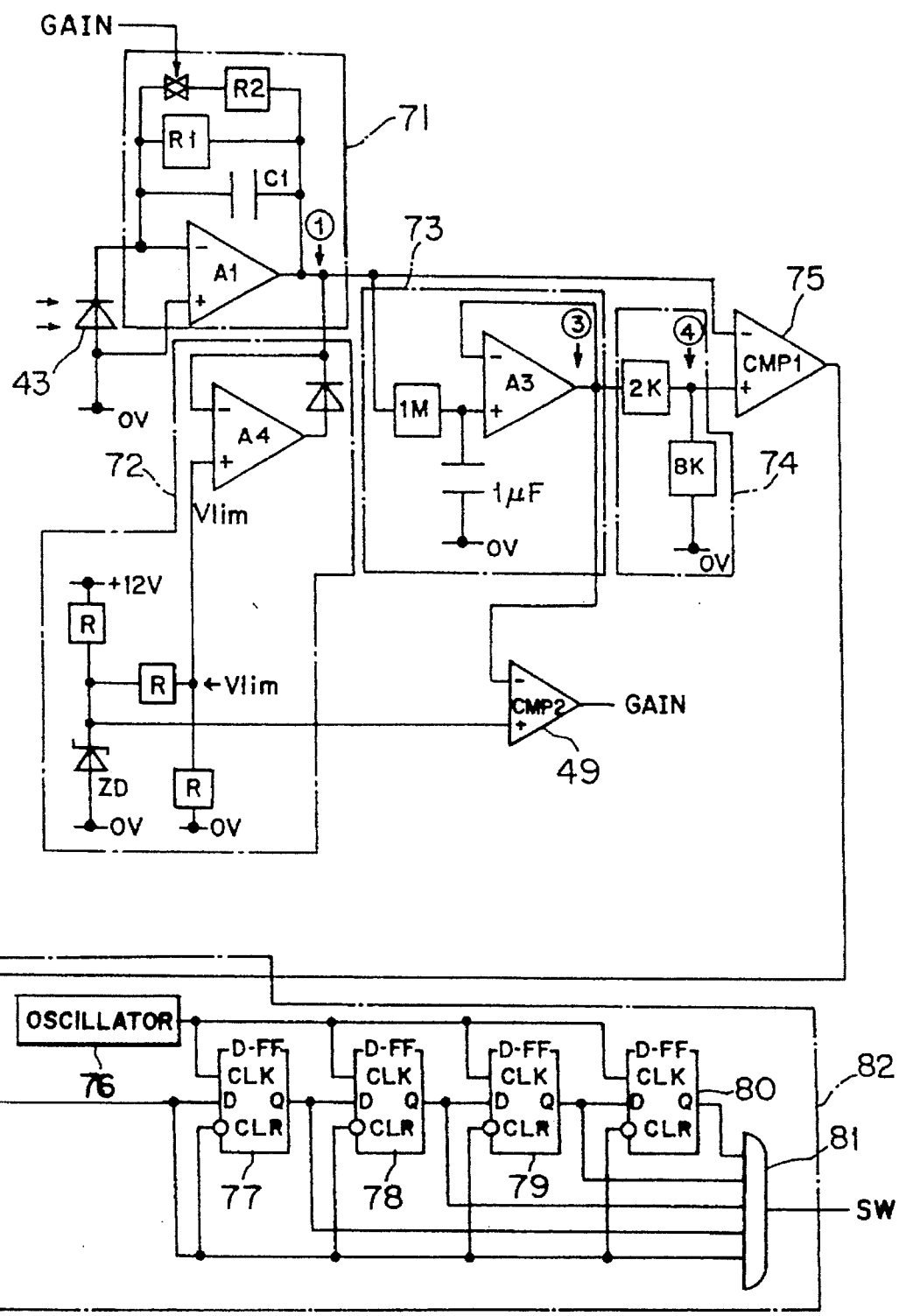
FIG. 15 is a block diagram showing another modification according to the first embodiment of the present invention.

In this case, the comparator 49 plus the ambient light detector shown in FIG. 13 are shown in FIG. 15. In the ambient light detector shown in FIG. 15, the comparator 49 compares the Zener diode voltage set to a predetermined voltage (Vlim) by the lower limiter unit 48 with the amplification voltage from the amplifier 119 in the average level operating unit 53. When the amplification voltage is more than the Zener diode voltage, the comparator outputs a high level signal to the analog switch 104. When the amplification voltage is not more than the Zener diode voltage, the comparator outputs a low level signal to the analog switch 104. The resistor 105 becomes conductive in response to a high level signal from the comparator 49 to increase the amplification factor of the amplifier 101. The resistor 105 becomes nonconductive in response to a low level signal from the comparator 49 to decrease the amplification factor of the amplifier 101.

Figure 16:
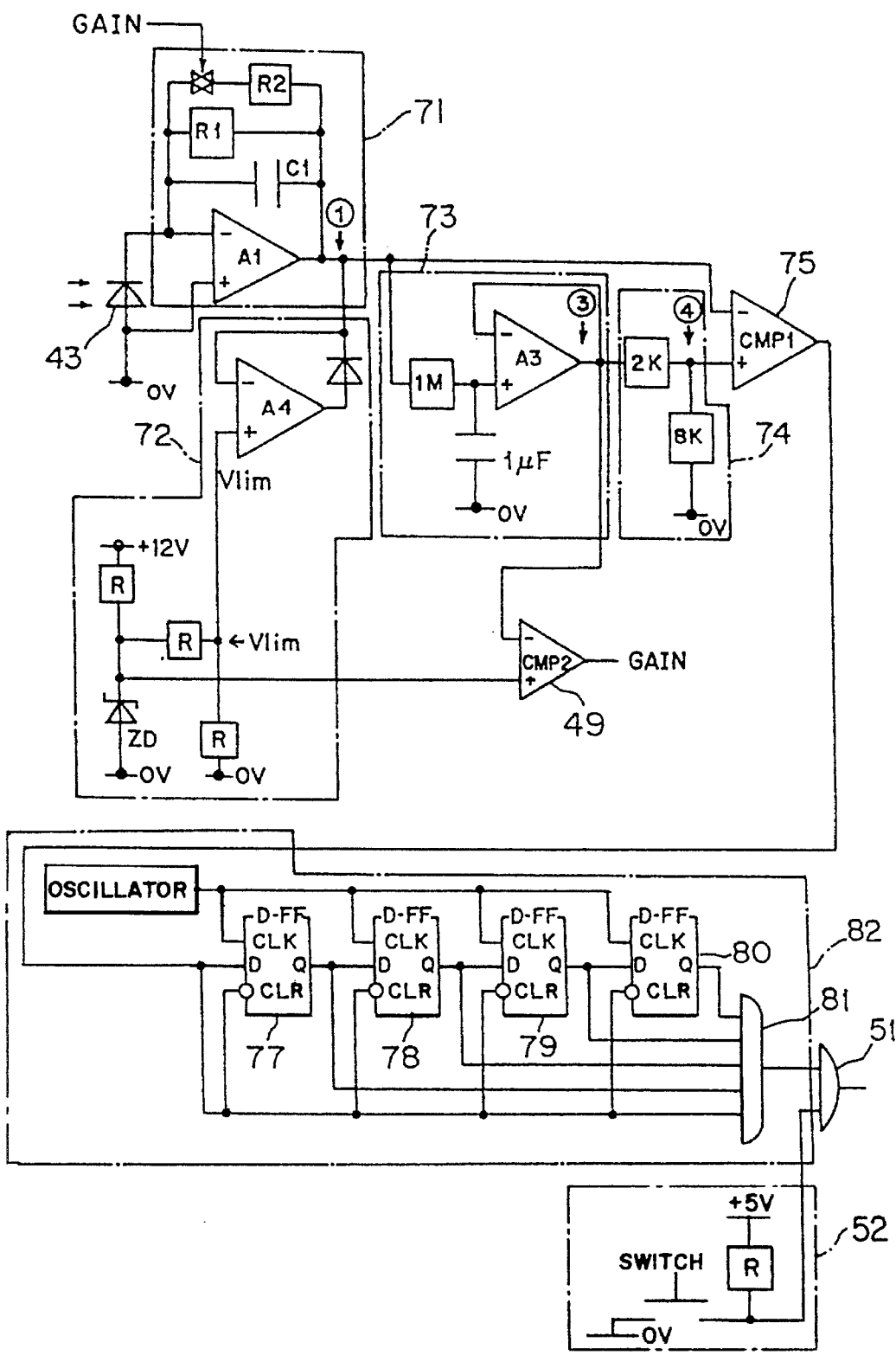
FIG. 16 is a block diagram showing another modification according to the first embodiment of the present invention.

The comparator 49 plus the ambient light detector shown in FIG. 14 are shown in FIG. 16. In the ambient light detector shown in FIG. 16, the comparator 49 receives the Zener diode voltage set to the predetermined voltage (Vlim) produced by the lower limiter unit 48 and the amplification voltage from the amplifier 119 in the average level operating unit 53. Thus like the ambient light detector shown in FIG. 15, the amplification factor of the amplifier 101 can be increased and decreased.

Figure 17:
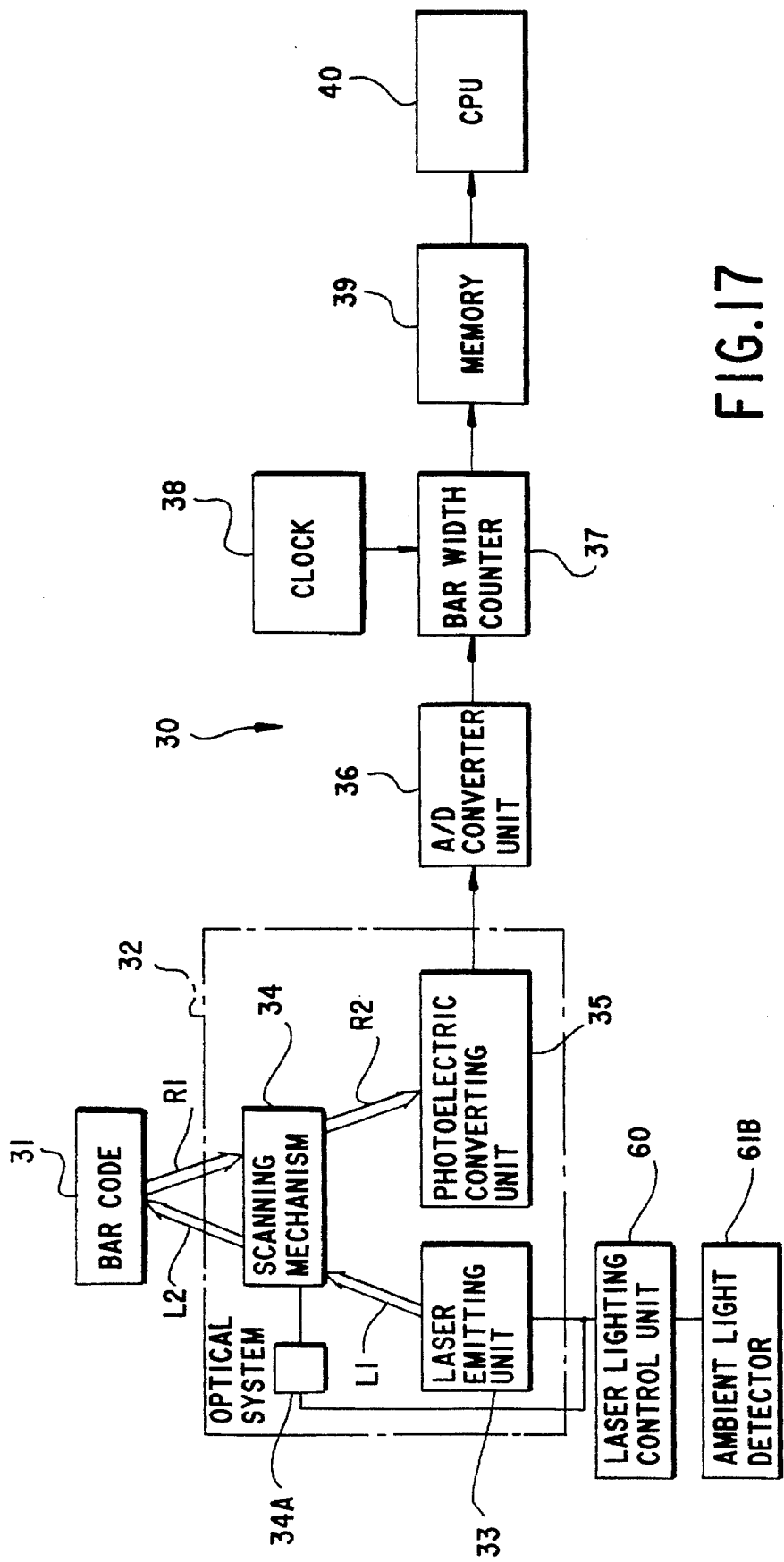
FIG. 17 is a block diagram showing the second embodiment of the present invention.

(c) Explanation of Second Embodiment:

FIG. 17 is a block diagram showing the second embodiment according to the present invention. In FIG. 17, like the block diagram of the first embodiment shown in FIG. 4, a laser lighting control device (for a bar code reader) using the ambient light detector applied for a bar code reader 30 is shown in FIG. 17.

The laser lighting control device for the bar code reader which uses the ambient light detector according to the present embodiment is different from that in the first embodiment shown in FIGS. 4 and 7 in that the photoelectric conversion unit 35 having a function of the ambient light detecting unit 41 as well as the means 34A which can hold the scanning mechanism 34 in operating state even if the laser emitting unit 33 stops emitting the laser beam L1 are prepared.

Hence as described later, the ambient light detector 61B has a different configuration from the ambient light detector 61A according to the first embodiment.

Numeral 60 represents a laser lighting control unit (laser lighting control means) similar to that in the first embodiment. The laser lighting control unit 60 controls the state of the laser beam L1 of the laser emitting unit 33 in response to ambient light detection information from the ambient light detector 61A. The ambient light detector 61A also outputs a signal to the means 34A to make the scanning mechanism 34 running, the means 34A leaving the scanning mechanism 34 in operating state even if the laser emitting unit 33 stops emitting the laser beam L1.

In the scanning mechanism 34 in an operating state, rotating the polygon mirror forming the scanning mechanism 34 at a low revolution rate can save the power consumption, compared with the case where the laser emitting unit 33 emits a laser beam L1.

The laser emitting unit 33, the scanning mechanism 34, the photoelectric conversion unit 35, the A/D converter unit 36, the bar width counter 37, the clock generator 38, the memory 39, and the CPU 40 have the same functions as those shown in FIG. 4, respectively.

Next, an explanation will be made in detail as for the ambient light detector 61B and the photoelectric converting unit 35.

Figure 18:
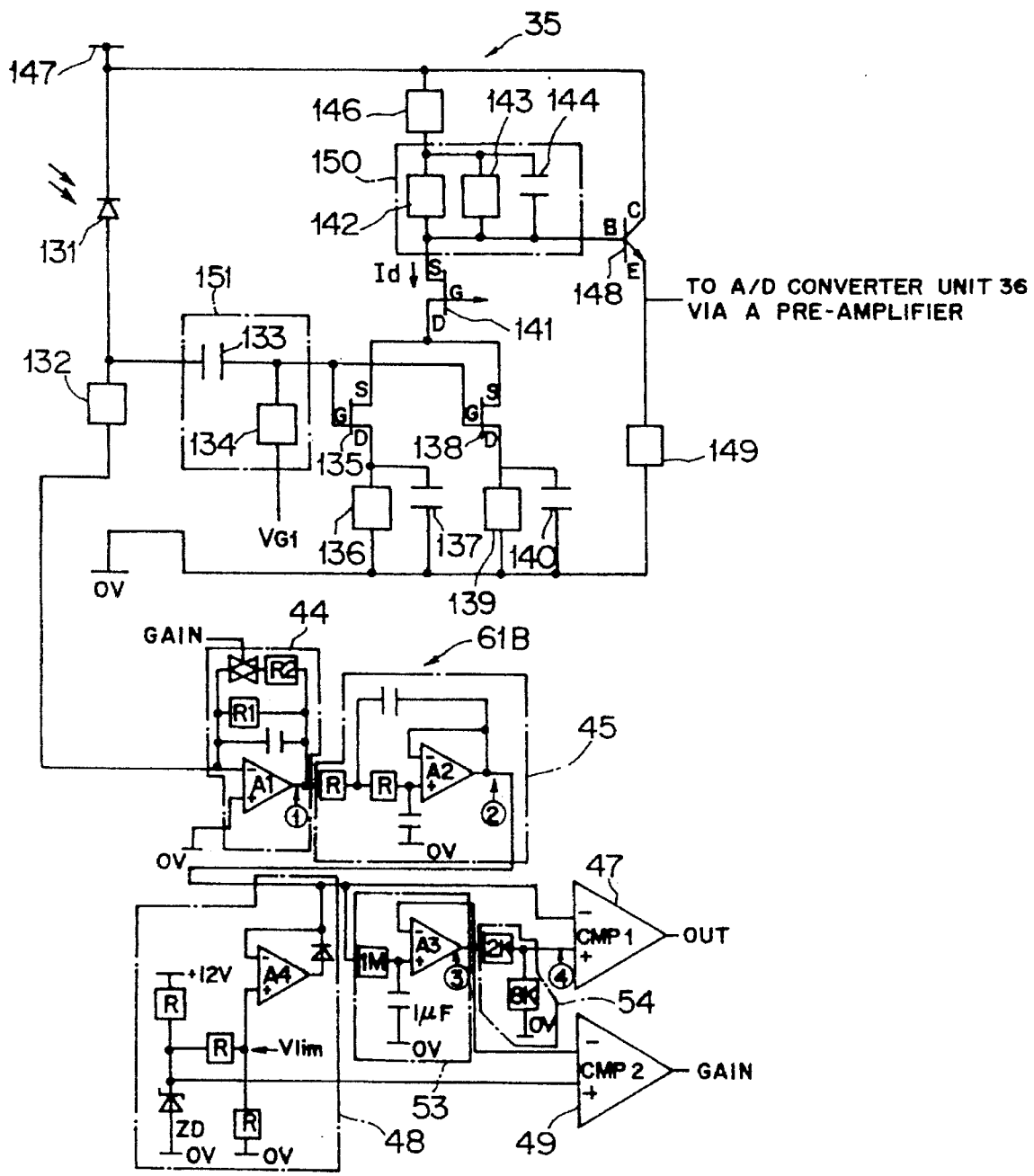
FIG. 18 is a block diagram showing in detail the ambient light detector according to the second embodiment of the present invention.
Figure 19:
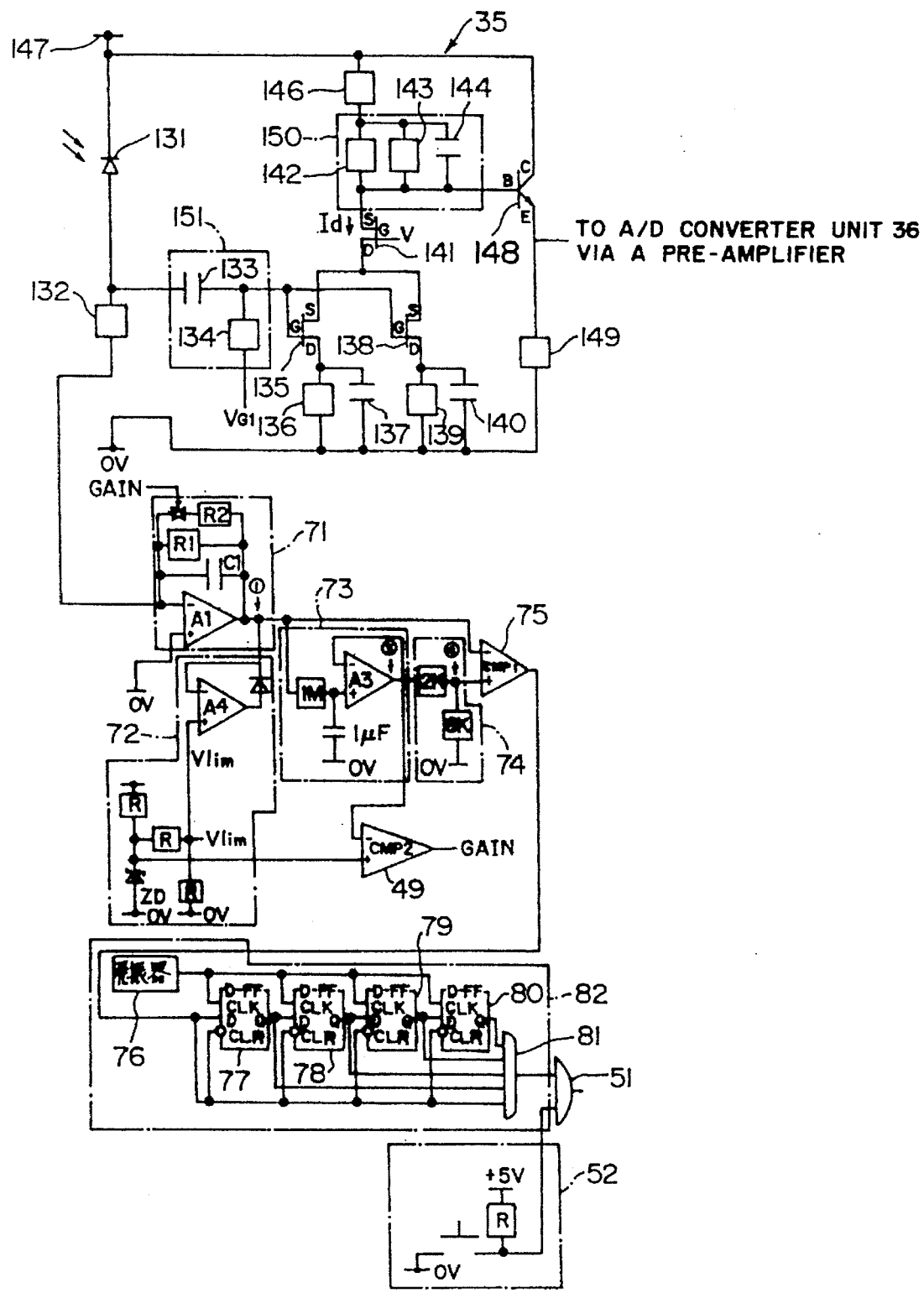
FIG. 19 is a block diagram showing another modification according to the first embodiment of the present invention.

FIG. 18 is a diagram showing in detail the ambient light detector and the photoelectric converting unit according to the second embodiment of the present invention. As shown in FIG. 18, in the ambient light detector 61B, the PIN photo diode 131 in the photoelectric converting unit 35 shares the function of the photo diode 43, compared with the ambient light detector 61A shown in FIG. 7.

Like the ambient light detector 61A according to the first embodiment shown in FIG. 7, the ambient light detector 61B includes the amplifying unit 44 acting as amplifying means, the integrating unit 45 acting as integrating means, the lower limiter unit 48 acting as lower limiter means, the comparison reference information producing unit 46 acting as comparison reference information producing means, the comparator 47 acting as comparing means, and the comparator 49 acting as amplification factor control means.

In the photoelectric converting unit 35 shown in FIG. 18, the PIN photo diode 131 receives the photo signal (laser beam) from the scanning mechanism 34 and produces a reverse signal according to the strength of the photo signal, the PIN photo diode 131 being driven on the power source 147.

That is, the PIN photo diode 131, as described above, detects the ambient light information as well as bar code information based on the photo signal from the scanning mechanism 34.

Numeral 132 represents a resistor. The resistor 134 is a bias voltage applying resistor with the bias voltage VG1 applied. The ambient light information from the PIN photo diode 131 is inputted to the amplifying unit 44 in the ambient light detector 61B via the resistor 132.

The coupling capacitor 133 and the resistor 134 exhibit their original functions. The two elements also form a high-pass filter 151 for cutting low frequency signals as disturbance light component existing in the signal from the PIN photo diode 131.

The cut-off frequency of the high-pass filter 151 is set near to the target frequency or frequency of a signal which is outputted from a photo signal input-type amplifying circuit to the A/D converter unit 36 to remove at maximum the low frequency signal components due to disturbance light such as fluorescent light.

Numerals 135 and 138 represent field effect transistors (FETs). The FET transistors 135 and 138 are connected in parallel to each other, each having the gate on which the signal from the PIN photo diode 131 as well as the bias voltage are applied. The resistor 136 and the capacitor 137 connected in parallel to each other are connected to the drain terminal of the FET transistor 135. The resistor 139 and the capacitor 140 connected in parallel to each other are connected to the drain terminal of the FET transistor 138.

Numeral 141 represents a FET transistor. The FET transistor 141 is connected to the FET transistors 135 and 138 in a cascade form to operate with the bias voltage VG2 applied.

Numeral 150 represents a resonance circuit. The resonance circuit 150, which is connected as a load to the source terminal of the FET transistor 141, strengthens a predetermined high frequency component of a signal frequency including bar code information. The resonance circuit 150 is formed of a resistor 142, a coil 143, and a capacitor 144, in parallel form.

Numeral 146 represents a voltage dropping resistor. The resistor 146 drops the voltage of the power source 147 to make the output signal at a maximum amplification.

In this case, the value of the resistor 146 is set such that the voltage drop V1 is the difference between the power source voltage (for example, the voltage, 12 volts, of the power source 147) and the drain/source voltage VDS of the FET transistor 141 is the maximum output signal to produce an output signal of the maximum amplitude. The voltage drop V1 is expressed by the following formula (1):

$$V1 = 12 - VDS \qquad (1)$$

Numeral 149 represents a resistor grounded, and 148 represents a bipolar transistor to output an output signal.

In the above configuration, the photo signal input-type amplifying circuit according to the second embodiment of the present invention operates as follows:

The PIN photo diode 131 biased by the power source 147 receives a photo signal to produce a reverse current according to the strength of the photo signal. The reverse current flows to the high-pass filter 151 and flows to the amplifier unit 44 in the ambient light detector 61B via the resistor 132.

In the ambient light detector 61B, the electrical signal inputted to the amplifier unit 44 is subjected to a signal process, like the ambient light detector 61A in the first embodiment.

When an operator performs a bar code reading operation, the comparator 47 outputs a control signal to force the laser emitting unit 33 to emit the laser beam L1. If not so, the laser emitting unit 33 does not emit the laser beam L1.

However, in this case, the means 34A maintains the scanning mechanism 34 which has received a control signal from the comparator 47, in an operating state, and rotates the polygon mirror constituting the scanning mechanism 34.

In the high-pass filter 151, the cut-off frequency is set near to a target frequency of the amplifier unit, or a frequency of a signal as an output signal outputted to the A/D converter unit 36 to cut the low frequency signal as disturbance light component existing in the signal.

The electrical signal of which the low frequency signals are cut by the high-pass filter 151 is inputted to the gate electrodes of the FET transistors 135 and 138. As a result, there is a potential difference between the drain to source voltage of the FET transistor 135 and the drain to source voltage of the FET transistor 138 so that a current Id flows through the resistor 146 from the power source 147.

The electrical signal from the PIN photo diode 131 is inputted to the drain electrode of the FET transistor 141. With the resonance circuit 150 and the resistor 146 acting as a load, the electrical signal is outputted as an output signal via the bipolar transistor 148.

The resistor 146 drops the voltage of the power source 147 to a desired voltage V1, or a voltage difference expressed by the formula (1) between the power source voltage and the drain to source voltage VDS of the FET transistor 141 to produce the output signal in a maximum amplitude.

As described above, the laser lighting control device for a bar code reader using the ambient light detector of the second embodiment of the present invention shares with the advantage shown in the first embodiment. Also, there is an advantage in that a simplified device and a reduced manufacturing cost can be realized because the photoelectric conversion 35 is shared with the ambient light detector 61B.

In the ambient light detector according to the first embodiment shown in FIG. 7, elements (except the photo diode 43) are used in common. Hence, like the first embodiment, in the laser lighting control device for a bar code reader using the ambient light detector in the present embodiment, the ambient light detector can be employed in different aspects as shown in FIGS. 12 to 16.

In those cases, the PIN photo diode 131 acts as the photo diode 43.

For example, in the laser lighting control device for a bar code reader using the ambient light detector according to the first embodiment, FIG. 20 shows that the ambient light detector is used similar to the ambient light detector shown in FIG. 16 as another modification of the first embodiment.

The ambient light detector shown in FIG. 20 includes the photoelectric conversion unit 35 in the ambient light detector shown in FIG. 18 and the PIN photo diode 131 with the function of the photo diode 43 in the ambient light detector shown in FIG. 16.

(d) Miscellaneous:

In the above embodiments, a photo diode is used as the photo detection/conversion means. According to the present invention, other photoelectric conversion elements such as a solar cell can be used as the photo detection/conversion element.

Moreover, in the above embodiments, the ambient light detector according to the present invention is applied to a bar code reader. It is noted that the present invention should not be limited only to the above embodiments.

What is claimed is:

1. An ambient light detector comprising:

ambient light detecting means for detecting an ambient light around a device; and judging means for providing a signal indicating that the ambient light detected by said ambient light detecting means has exceeded a predetermined value for at least predetermined time, said ambient light detecting means including light detection/conversion means for detecting an ambient light around a device to convert the ambient light into an electrical signal, and amplifying means for amplifying the electrical signal from said light detection/conversion means, said judging means including integrating means for integrating a signal from said amplifying means based on a predetermined time constant comparison reference information producing means for producing comparison reference information following a change in said ambient light, in response to the signal from said integrating means, and comparing means for comparing the output from said integrating means with the output from said comparison reference information producing means.

2. An ambient light detector according to claim 1, wherein said comparison reference information producing means comprises an average level operating means for operating an average level of a signal from said integrating means; and output proportionally dividing means for dividing proportionally the output from said average level operating means at a predetermined ratio.

3. An ambient light detector according to claim 1, wherein said integrating means comprises a low pass filter which passes a variation rate of a light to be detected and blocks noises due to an ambient light source around the device.

4. An ambient light detector according to claim 1, further comprising lower limiter means connected to the output of said integrating means, for nullifying the light variation detection when said ambient light is less than the predetermined level.

5. An ambient light detector according to claim 1, further comprising amplification factor control means which controls an amplification factor of said amplifying means based on the ambient light information around the device.

6. An ambient light detector according to claim 1, further comprising directivity adding means connected to said light detection/conversion means, for providing a directional light detection sensitivity to said light detection/conversion means.

7. An ambient light detector according to claim 6, wherein said directivity adding means comprises a slit member arranged in front of said light detection/conversion means.

8. An ambient light detector according to claim 6, wherein said directivity adding means comprises a lens arranged in front of said light detection/conversion means.

9. An ambient light detector according to claim 1, further comprising forcibly outputting means connected to the output of said judging means, to output forcibly a signal corresponding to a signal indicating that the ambient light detected by said ambient light detecting means has changed for at least a predetermined time.

10. An ambient light detector according to claim 9, wherein said forcibly outputting means outputs forcibly a signal corresponding to a signal indicating that the ambient light detected by said ambient light detecting means is varied for at least a predetermined time when a manual switch means is turned on.

11. An ambient light detector according to claim 1, wherein said ambient light detecting means comprises light detection/conversion means for detecting an ambient light around a device to convert said ambient light into an electrical signal, and amplifying means for amplifying the electrical signal from said light detection/conversion means; and wherein said judging means comprises comparison reference information producing means for producing comparison reference information following a change in said ambient light, in response to a signal from said amplifying means, comparing means for comparing the output of said amplifying means with the output of said comparison reference information producing means, and device ambient noise removing means for nullifying the output thereof when said comparing means produces an output less than a level at which a light to be detected is varied.

12. An ambient light detector according to claim 11, wherein said device ambient noise removing means comprises a shift register.

13. An ambient light detector according to claim 11, further comprising lower limiter means connected to the input of said judging means, to nullify a light variation detection when the ambient light level is less than a predetermined value.

14. An ambient light detector according to claim 11, further comprising amplification factor control means for controlling the amplification factor of said amplifying means based on information on ambient light around a device.

15. An ambient light detector according to claim 11, further comprising directivity adding means connected to said light detection/conversion means, to provide a directional light detection sensitivity to said light detection/conversion means.

16. An ambient light detector according to claim 15, wherein said directivity adding means comprises a slit member arranged in front of said light detection/conversion means.

17. An ambient light detector according to claim 15, wherein said directivity adding means comprises a lens arranged in front of said light detection/conversion means.

18. An ambient light detector according to claim 11, wherein said comparison reference information producing means comprises an average level operating means for operating an average level of a signal from said amplifying means; and output proportionally dividing means for dividing proportionally the output from said average level operating means at a predetermined ratio.

19. A bar code reader which includes optical scanning means for scanning light from a laser on a bar code and receiving means for receiving light reflected on said bar code, comprising:

an ambient light detector including ambient light detecting means for detecting an ambient light around a device and judging means for providing a signal indicating that the ambient light detected by said ambient light detecting means has exceeded a predetermined value for at least a predetermined period of time, wherein said judging means includes a lower limiter means for nullifying a light variation detection when said ambient light is less than said predetermined value; and laser lighting control means for controlling the lighting state of said laser in accordance with a result detected by said ambient light detector.

20. A laser lighting control device suitable for a bar code reader, said laser lighting control device using an ambient light detector, comprising:

an ambient light detector which is formed of an ambient light detecting means for detecting an ambient light around a device, and judging means for producing a signal indicating that the ambient light detected by said ambient detecting means exceeds a predetermined value for at least a predetermined time, said ambient light detecting means including light detection/conversion means for detecting an ambient light around a device to convert the ambient light into an electrical signal, and amplifying means for amplifying the electrical signal from said light detection/conversion means, and said judging means including integrating means for integrating a signal from amplifying means based on a predetermined time constant, comparison reference information producing means for producing comparison reference information following a change in said ambient light, in response to the signal from said integrating means, and comparing means for comparing the output from said integrating means with the output from said comparison reference information producing means; and laser lighting control means for controlling the lighting state of said laser in accordance with a result detected by said ambient light detector.

21. A laser lighting control device suitable for a bar code reader, said laser lighting control device including an ambient light detector, according to claim 20, wherein said comparison reference information producing means comprises an average level operating means for operating an average level of a signal from said integrating means; and output proportionally dividing means for dividing proportionally the output from said average level calculating means at a predetermined ratio.

22. A laser lighting control device suitable for a bar code reader, said laser lighting control device including an ambient light detector, according to claim 20, wherein said integrating means comprises a low pass filter which passes a variation rate of light to be detected and blocks noises due to an ambient light source around a device.

23. A laser lighting control device suitable for a bar code reader, said laser lighting control device including an ambient light detector, according to claim 20, further comprising lower limiter means which nullifies the light variation detection when said ambient light is less than a predetermined level to the output of said integrating means.

24. A laser lighting control device suitable for a bar code reader, said laser lighting control device including an ambient light detector, according to claim 20, further comprising amplification factor control means which controls an amplification factor of said amplifying means based on the ambient light around a device.

25. A laser lighting control device suitable for a bar code reader, said laser lighting control device including an ambient light detector, according to claim 20, further comprising directivity adding means connected to said light detection/conversion means, to provide a directional light detection sensitivity to said light detection/conversion means.

26. A laser lighting control device suitable for a bar code reader, said laser lighting control device including an ambient light detector, according to claim 25, wherein said directivity adding means comprises a slit member arranged in front of said light detection/conversion means.

27. A laser lighting control device suitable for a bar code reader, said laser lighting control device including an ambient light detector, according to claim 25, wherein said directivity adding means comprises a lens arranged in front of said light detection/conversion means.

28. A laser lighting control device suitable for a bar code reader, said laser lighting control device including an ambient light detector, according to claim 20, further comprising forcibly outputting means connected to the output of said judging means, to output forcibly a signal corresponding to a signal indicating that the ambient light detected by said ambient light detecting means has varied for at least a predetermined time.

29. A laser lighting control device suitable for a bar code reader, said laser lighting control device including an ambient light detector, according to claim 28, wherein said forcibly outputting means outputs forcibly a signal corresponding to a signal indicating that an ambient light detected by said ambient light detecting means is varied more than a predetermined time when a manual switch means is turned on.

30. A laser lighting control device suitable for a bar code reader, said laser lighting control device including an ambient light detector, according to claim 20, wherein said ambient light detecting means comprises light detection/conversion means for detecting an ambient light around a device to convert said ambient light into an electrical signal, and amplifying means for amplifying the electrical signal from said light detection/conversion means; and wherein said judging means comprises comparison reference information producing means for producing comparison reference information following a change in said ambient light, in response to a signal from said amplifying means, comparing means for comparing the output of said amplifying means with the output of said comparison reference information producing means, and device ambient noise removing means for nullifying the output thereof when the output of said comparing means is less than a variation in light to be detected.

31. A laser lighting control device suitable for a bar code reader, said laser lighting control device including an ambient light detector, according to claim 30, wherein said ambient noise removing means comprises a shift register.

32. A laser lighting control device suitable for a bar code reader, said laser lighting control device including an ambient light detector, according to claim 30, further comprising lower limiter means connected to the input of said judging means, to nullify a light variation detection when the ambient light level is less than a predetermined value.

33. A laser lighting control device suitable for a bar code reader, said laser lighting control device including an ambient light detector, according to claim 30, further comprising amplification factor control means for controlling the amplification factor of said amplifying means based on information on ambient light around a device.

34. A laser lighting control device suitable for a bar code reader, said laser lighting control device including an ambient light detector, according to claim 30, further comprising said directivity adding means connected to said light detection/conversion means, to provide a directional light detection sensitivity to said light detection/conversion means.

35. A laser lighting control device suitable for a bar code reader, said laser lighting control device including an ambient light detector, according to claim 34, wherein said directivity adding means comprises a slit member arranged in front of said light detection/conversion means.

36. A laser lighting control device suitable for a bar code reader, said laser lighting control device including an ambient light detector, according to claim 34, wherein said directivity adding means comprises a lens arranged in front of said light detection/conversion means.

37. A laser lighting control device suitable for a bar code reader, said laser lighting control device including an ambient light detector, according to claim 30, wherein said comparison reference information producing means comprises an average level operating means for operating an average level of a signal from said amplifying means; and output proportionally dividing means for dividing proportionally the output from said average level operating means at a predetermined ratio.

38. A bar code reader which includes optical scanning means for scanning light from a laser on a bar code and receiving means for receiving light reflected on said bar code, comprising:

an ambient light detector including ambient light detecting means for detecting an ambient light around a device and judging means for providing a signal indicating that the ambient light detected by said ambient light detecting means has exceeded a predetermined value for at least a predetermined period of time, wherein said judging means includes a lower limiter means for nullifying a light variation detection when said ambient light is less than said predetermined value.

39. A laser lighting control device suitable for a bar code reader, said laser lighting control device including an ambient light detector, comprising:

ambient light detector including:

optical scanning means arranged between a laser and a bar code for illuminating light from said laser onto said bar code;

receiving means for receiving light reflected on said bar code;

ambient light detecting means for detecting an ambient light around a device; and judging means for producing a signal indicating that the ambient light detected by said ambient light detecting means has exceeded a predetermined value for at least a predetermined time, said ambient light detecting means including light detection/conversion means for detecting an ambient light around a device to convert the ambient light into an electrical signal, and amplifying means for amplifying the electrical signal from said light detection/conversion means, and said judging means including integrating means for integrating a signal from said amplifying means based on a predetermined time constant comparison reference information producing means for producing comparison reference information following a change in said ambient light, in response to the signal from said integrating means, and comparing means for comparing the output from said integrating means with the output from said comparison reference information producing means; and laser lighting control means for controlling the lighting state of said laser in accordance with a result detected by said ambient light detector, said receiving means and said ambient light detector being shared to each other.

40. A laser lighting control device suitable for a bar code reader, said laser lighting control device including an ambient light detector, according to claim 39, further comprising means for making said optical scanning means in operation state in no predetermined time reading operation even if said laser is in no operation, and wherein said receiving means and said ambient light detecting means are shared to each other.

41. A bar code reader which includes optical scanning means for scanning light from a laser on a bar code and receiving means for receiving light reflected on said bar code, comprising:

an ambient light detector including ambient light detecting means for detecting an ambient light around a device and judging means for providing a signal indicating that the ambient light detected by said ambient light detecting means has exceeded a predetermined value for at least a predetermined time, said ambient light detecting means including light detection/conversion means for detecting an ambient light around a device to convert the ambient light into an electrical signal, and amplifying means for amplifying the electrical signal from said light detection/conversion means, and said judging means including integrating means for integrating a signal from said amplifying means based on a predetermined time constant comparison reference information producing means for producing comparison reference information following a change in said ambient light in response to the signal from said integrating means, and comparing means for comparing the output from said integrating means with the output from said comparison reference information producing means.

42. A bar code reader which includes optical scanning means for scanning light from a laser on a bar code and receiving means for receiving light reflected on said bar code, comprising:

an ambient light detector including ambient light detecting means for detecting an ambient light around a device and judging means for providing a signal indicating that the ambient light detected by said ambient light detecting means has exceeded a predetermined value for at least a predetermined time, said ambient light detecting means including light detection/conversion means for detecting an ambient light around a device to convert the ambient light into an electrical signal, and amplifying means for amplifying the electrical signal from said light detection/conversion means, and said judging means including integrating means for integrating a signal from said amplifying means based on a predetermined time constant, comparison reference information producing means for producing comparison reference information following a change in said ambient light, in response to the signal from said integrating means, and comparing means for comparing the output from said integrating means with the output from said comparison reference information producing means; and laser lighting control means for controlling the lighting state of said laser in accordance with a result detected by said ambient light detector.

43. An ambient light detector, comprising:

ambient light detecting means for detecting an ambient light around a device; and judging means for providing a signal indicating that the ambient light detected by said ambient light detecting means has exceeded a predetermined value for at least predetermined period of time, wherein said judging means includes a lower limiter means for nullifying a light variation detection when said ambient light is less than said predetermined value.

44. A laser lighting control device suitable for a bar code reader, comprising:

an ambient light detector having an ambient light detecting means for detecting an ambient light around a device, and judging means for producing a signal indicating that the ambient light detected by said ambient detecting means exceeds a predetermined value for at least a predetermined period of time; and laser lighting control means for controlling the lighting state of said laser in accordance with a result detected by said ambient light detector, wherein said judging means includes a lower limiter means for nullifying a light variation detection when said ambient light is less than said predetermined value.

45. A laser lighting control device suitable for a bar code reader, said laser lighting control device including an ambient light detector, comprising:

ambient light detector including:

optical scanning means arranged between a laser and a bar code for illuminating light from said laser onto said bar code;

receiving means for receiving light reflected on said bar code;

ambient light detecting means for detecting an ambient light around a device; and judging means for producing a signal indicating that the ambient light detected by said ambient light detecting means has exceeded a predetermined value for at least a predetermined period of time, wherein said judging means includes a lower limiter means for nullifying a light variation detection when said ambient light is less than said predetermined value; and laser lighting control means for controlling the lighting state of said laser in accordance with a result detected by said ambient light detector, an ambient light being shared by said receiving means and said ambient light detector.

\* \* \* \* \*